United States Patent
Fujita et al.

(10) Patent No.: US 10,167,541 B2
(45) Date of Patent: Jan. 1, 2019

(54) ALLOYED HOT-DIP GALVANIZED STEEL SHEET AND METHOD OF MANUFACTURING THE SAME

(71) Applicant: NIPPON STEEL & SUMITOMO METAL CORPORATION, Tokyo (JP)

(72) Inventors: Soshi Fujita, Tokyo (JP); Shintaro Yamanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 587 days.

(21) Appl. No.: 14/438,503

(22) PCT Filed: Nov. 5, 2013

(86) PCT No.: PCT/JP2013/079858
§ 371 (c)(1),
(2) Date: Apr. 24, 2015

(87) PCT Pub. No.: WO2014/073520
PCT Pub. Date: May 15, 2014

(65) Prior Publication Data
US 2015/0275345 A1     Oct. 1, 2015

(30) Foreign Application Priority Data

Nov. 6, 2012  (JP) ................. 2012-244274

(51) Int. Cl.
B32B 15/00     (2006.01)
C23C 2/28      (2006.01)
(Continued)

(52) U.S. Cl.
CPC ............. C23C 2/28 (2013.01); B32B 15/013 (2013.01); C21D 6/001 (2013.01); C21D 6/002 (2013.01);
(Continued)

(58) Field of Classification Search
CPC ............ C23C 2/28; B32B 15/013; C21D 9/46
(Continued)

(56) References Cited

U.S. PATENT DOCUMENTS

2011/0253263 A1    10/2011  Fushiwaki et al.
2012/0152411 A1*    6/2012  Morimoto ............ B22D 11/115
                                                148/533
(Continued)

FOREIGN PATENT DOCUMENTS

CN       102482753 A    5/2012
EP         1149928 A1  10/2001
(Continued)

OTHER PUBLICATIONS

MSE 300 Materials Laboratory Procedures, Iron-Carbon Phase Diagram (a review) see Callister Chapter 9, University of Tennessee, p. 2-3.*

(Continued)

Primary Examiner — David Sample
Assistant Examiner — Mary I Omori
(74) Attorney, Agent, or Firm — Birch, Stewart, Kolasch & Birch, LLP

(57) ABSTRACT

Provided is an alloyed hot-dip galvanized steel sheet including a base steel sheet, the base steel sheet containing a given amount of C, Si, Mn, and other elements. The alloyed hot-dip galvanized steel sheet is provided with an alloyed hot-dip galvanized layer on a surface of the base steel sheet, the alloyed hot-dip galvanized layer containing, in mass %, Fe: more than or equal to 5% and less than or equal to 15%, and having a thickness of more than or equal to 3 μm and less than or equal to 30 μm. The alloyed hot-dip galvanized steel sheet includes an A layer immediately under the surface of the base steel sheet, the A layer being formed in the base steel sheet and having a thickness of more than or equal to (Continued)

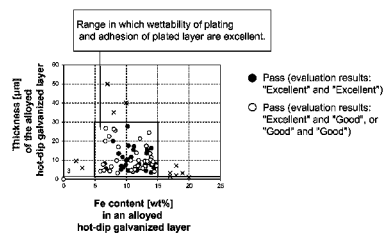

2 μm and less than or equal to 20 μm from the surface of the base steel sheet, containing more than or equal to 50 vol % of a ferrite structure, and containing more than or equal to 90 mass % of unoxidized Fe, less than or equal to 10 mass % of a total of contents of oxides of Fe, Si, Mn, P, S, and Al, and less than 0.05 mass % of C.

4 Claims, 11 Drawing Sheets

(51) Int. Cl.
| | |
|---|---|
| C23C 2/06 | (2006.01) |
| C21D 9/46 | (2006.01) |
| C22C 18/00 | (2006.01) |
| C22C 38/00 | (2006.01) |
| C22C 38/06 | (2006.01) |
| C22C 38/58 | (2006.01) |
| B32B 15/01 | (2006.01) |
| C22C 38/02 | (2006.01) |
| C22C 38/04 | (2006.01) |
| C21D 6/00 | (2006.01) |
| C21D 8/02 | (2006.01) |
| C22C 38/08 | (2006.01) |
| C22C 38/12 | (2006.01) |
| C22C 38/14 | (2006.01) |
| C22C 38/16 | (2006.01) |
| C22C 38/26 | (2006.01) |
| C22C 38/28 | (2006.01) |
| C22C 38/32 | (2006.01) |
| C22C 38/34 | (2006.01) |
| C22C 38/38 | (2006.01) |
| C23C 2/02 | (2006.01) |

(52) U.S. Cl.
CPC ............ *C21D 6/004* (2013.01); *C21D 6/005* (2013.01); *C21D 6/008* (2013.01); *C21D 8/0226* (2013.01); *C21D 8/0263* (2013.01); *C21D 9/46* (2013.01); *C22C 18/00* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/34* (2013.01); *C22C 38/38* (2013.01); *C22C 38/58* (2013.01); *C23C 2/02* (2013.01); *C23C 2/06* (2013.01); *Y10T 428/12799* (2015.01)

(58) Field of Classification Search
USPC ........................................................ 428/659
See application file for complete search history.

(56) References Cited

U.S. PATENT DOCUMENTS

| | | | | |
|---|---|---|---|---|
| 2013/0071687 A1* | 3/2013 | Takagi | ................ | C21D 8/0226 428/659 |
| 2014/0234656 A1* | 8/2014 | Fujita | ........................ | C23C 2/02 428/659 |

FOREIGN PATENT DOCUMENTS

| | | |
|---|---|---|
| EP | 2145973 A1 | 1/2010 |
| EP | 2474639 A1 | 7/2012 |
| JP | 55-122865 A | 9/1980 |
| JP | 2000-309847 A | 11/2000 |
| JP | 2001-279412 A | 10/2001 |
| JP | 2001-323355 A | 11/2001 |
| JP | 2007-211280 A | 8/2007 |
| JP | 2008-007842 A | 1/2008 |
| JP | 2009-209397 A | 9/2009 |
| JP | 2010-126757 A | 6/2010 |
| JP | 2011-153349 A | 8/2011 |
| JP | 2011-231367 A | 11/2011 |
| JP | 2012-12655 A | 1/2012 |
| JP | 2012-12683 A | 1/2012 |
| KR | 10-2012-0049295 A | 5/2012 |
| RU | 2312162 C2 | 12/2007 |
| RU | 2312920 C2 | 12/2007 |
| TW | 201202442 A | 1/2012 |
| WO | WO 2011/025042 A1 | 3/2011 |

OTHER PUBLICATIONS

International Search Report, dated Jan. 28, 2014, issued in PCT/JP2013/079858.
Office Action, dated Dec. 16, 2014, issued in Taiwanese Patent Application No. 102140116.
Written Opinion of the International Searching Authority, dated Jan. 28, 2014, issued in PCT/JP2013/079858.
Korean Office Action for Korean Application No. 10-2015-7011287, dated Aug. 29, 2016, with a partial English translation.
Canadian Office Action, dated Feb. 13, 2017, for Canadian Application No. 2,888,738.
Russian Office Action and Search Report, dated Jan. 31, 2017, for Russian Application No. 2015121407 together with an English translation thereof.
Extended European Search Report for European Application No. 13853672.7, dated Jun. 22, 2016.
European Communication Pursuant to Article 94(3) EPC, dated Dec. 18, 2017 for corresponding European Application No. 13853672.7.
Chinese Office Action and Search Report for Chinese Application No. 201380058134.2, dated Jan. 27, 2016, with a partial English translation.

\* cited by examiner

FIG. 1

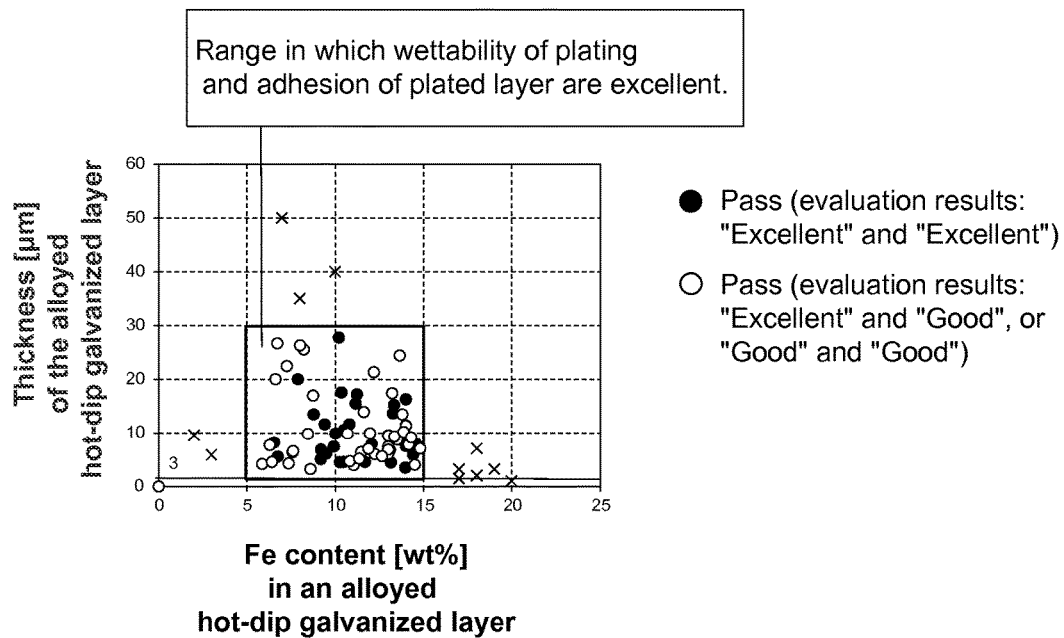

Evaluation results: "Excellent" and "Excellent"
  →Wettability of plating and adhesion of plated layer are both "Excellent".
Evaluation results: "Excellent" and "Good"
    →One of wettability of plating and adhesion of plated layer is
     "Excellent" and the other is "Good".
Evaluation results: "Good" and "Good"
  →Wettability of plating and adhesion of plated layer are both "Good".
Evaluation results: "Good" and "Poor"
    →One of wettability of plating and adhesion of plated layer is
     "Good" and the other is "Poor".
Evaluation results: "Poor" and "Poor"
  →Wettability of plating and adhesion of plated layer are both "Poor".

FIG. 2

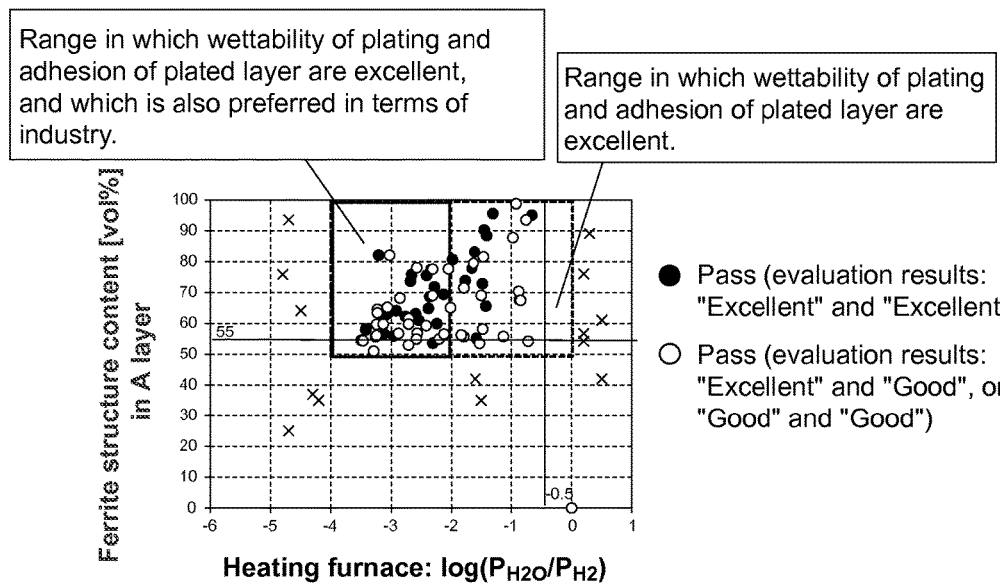

Evaluation results: "Excellent" and "Excellent"
→Wettability of plating and adhesion of plated layer are both "Excellent".
Evaluation results: "Excellent" and "Good"
→One of wettability of plating and adhesion of plated layer is
"Excellent" and the other is "Good".
Evaluation results: "Good" and "Good"
→Wettability of plating and adhesion of plated layer are both "Good".
Evaluation results: "Good" and "Poor"
→One of wettability of plating and adhesion of plated layer is
"Good" and the other is "Poor".
Evaluation results: "Poor" and "Poor"
→Wettability of plating and adhesion of plated layer are both "Poor".

FIG. 3

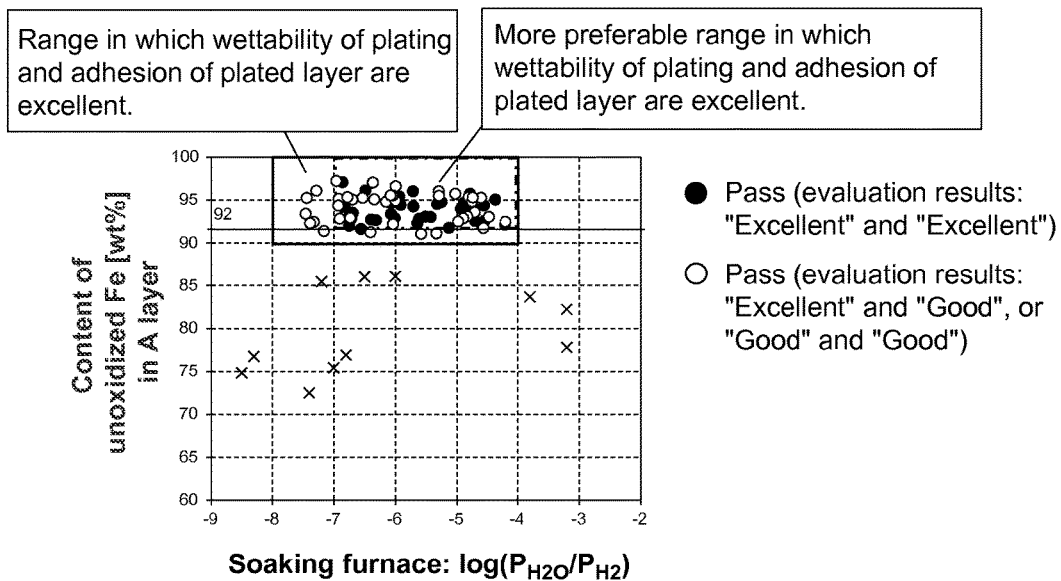

Evaluation results: "Excellent" and "Excellent"
  →Wettability of plating and adhesion of plated layer are both "Excellent".
Evaluation results: "Excellent" and "Good"
  →One of wettability of plating and adhesion of plated layer is
    "Excellent" and the other is "Good".
Evaluation results: "Good" and "Good"
  →Wettability of plating and adhesion of plated layer are both "Good".
Evaluation results: "Good" and "Poor"
  →One of wettability of plating and adhesion of plated layer is
    "Good" and the other is "Poor".
Evaluation results: "Poor" and "Poor"
  →Wettability of plating and adhesion of plated layer are both "Poor".

FIG. 4

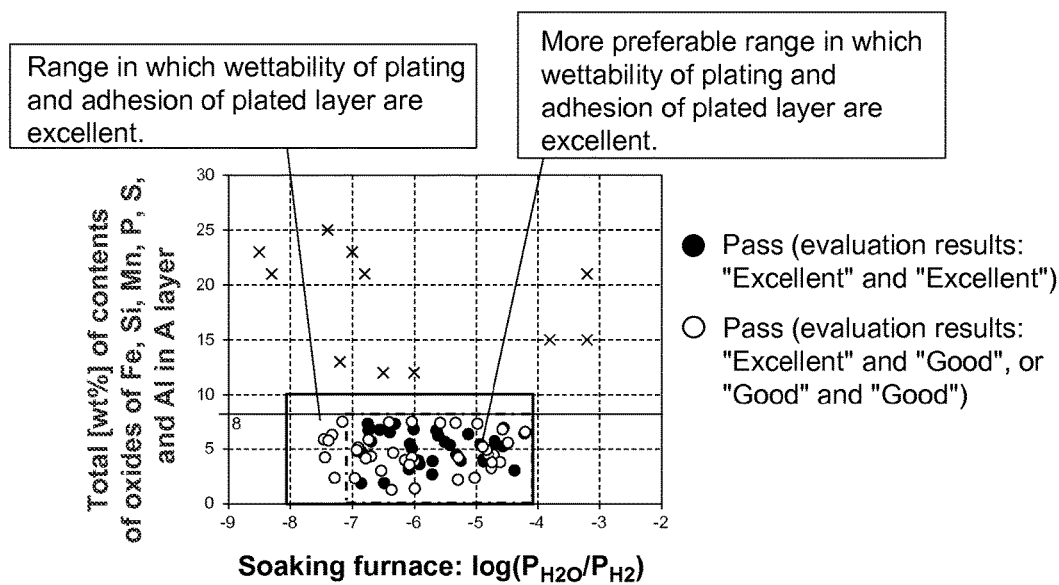

Evaluation results: "Excellent" and "Excellent"
  →Wettability of plating and adhesion of plated layer are both "Excellent".
Evaluation results: "Excellent" and "Good"
    →One of wettability of plating and adhesion of plated layer is
      "Excellent" and the other is "Good".
Evaluation results: "Good" and"Good"
  →Wettability of plating and adhesion of plated layer are both "Good".
Evaluation results: "Good" and "Poor"
    →One of wettability of plating and adhesion of plated layer is
      "Good" and the other is "Poor".
Evaluation results: "Poor" and "Poor"
  →Wettability of plating and adhesion of plated layer are both "Poor".

FIG. 5

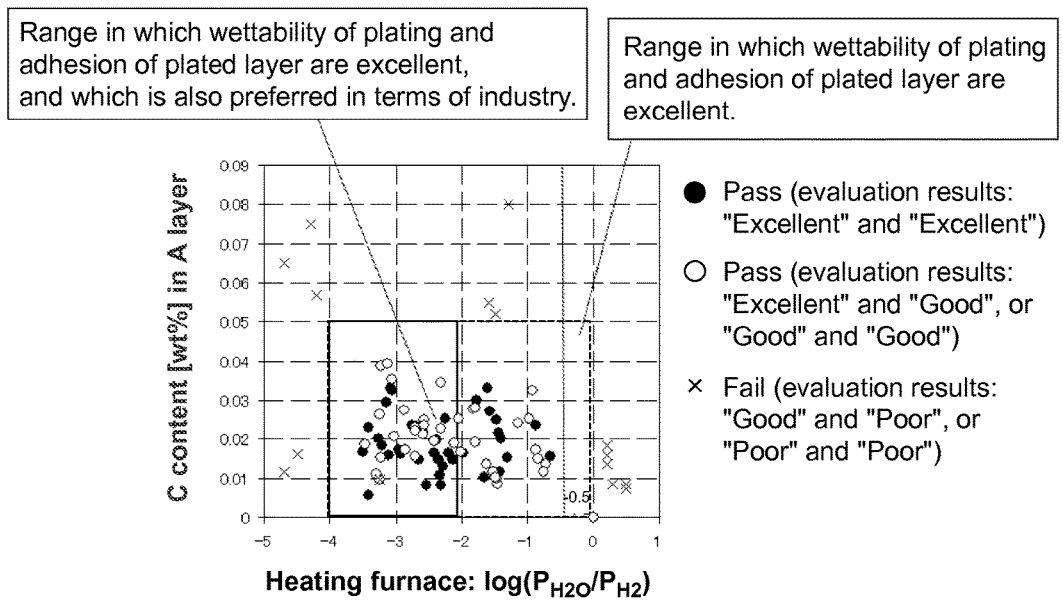

Evaluation results: "Excellent" and "Excellent"
   →Wettability of plating and adhesion of plated layer are both "Excellent".
Evaluation results: "Excellent" and "Good"
   →One of wettability of plating and adhesion of plated layer is
      "Excellent" and the other is "Good".
Evaluation results: "Good" and"Good"
   →Wettability of plating and adhesion of plated layer are both "Good".
Evaluation results: "Good" and "Poor"
   →One of wettability of plating and adhesion of plated layer is
      "Good" and the other is "Poor".
Evaluation results: "Poor" and "Poor"
   →Wettability of plating and adhesion of plated layer are both "Poor".

FIG. 6

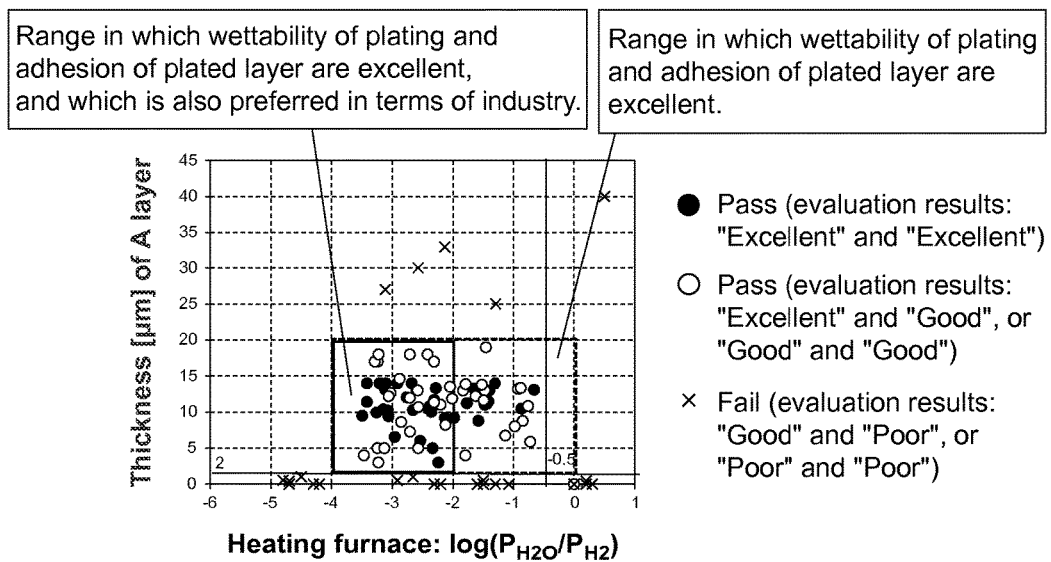

Evaluation results: "Excellent" and "Excellent"
  →Wettability of plating and adhesion of plated layer are both "Excellent".
Evaluation results: "Excellent" and "Good"
    →One of wettability of plating and adhesion of plated layer is
      "Excellent" and the other is "Good".
Evaluation results: "Good" and "Good"
    →Wettability of plating and adhesion of plated layer are both "Good".
Evaluation results: "Good" and "Poor"
    →One of wettability of plating and adhesion of plated layer is
      "Good" and the other is "Poor".
Evaluation results: "Poor" and "Poor"
    →Wettability of plating and adhesion of plated layer are both "Poor".

FIG. 7

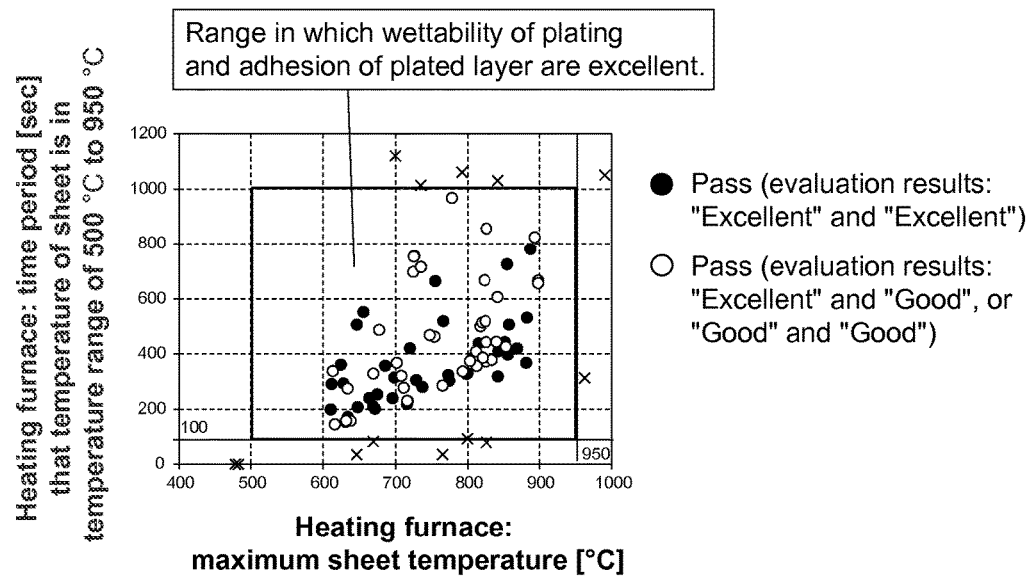

Evaluation results: "Excellent" and "Excellent"
  →Wettability of plating and adhesion of plated layer are both "Excellent".
Evaluation results: "Excellent" and "Good"
  →One of wettability of plating and adhesion of plated layer is
    "Excellent" and the other is "Good".
Evaluation results: "Good" and "Good"
  →Wettability of plating and adhesion of plated layer are both "Good".
Evaluation results: "Good" and "Poor"
  →One of wettability of plating and adhesion of plated layer is
    "Good" and the other is "Poor".
Evaluation results: "Poor" and "Poor"
  →Wettability of plating and adhesion of plated layer are both "Poor".

FIG. 8

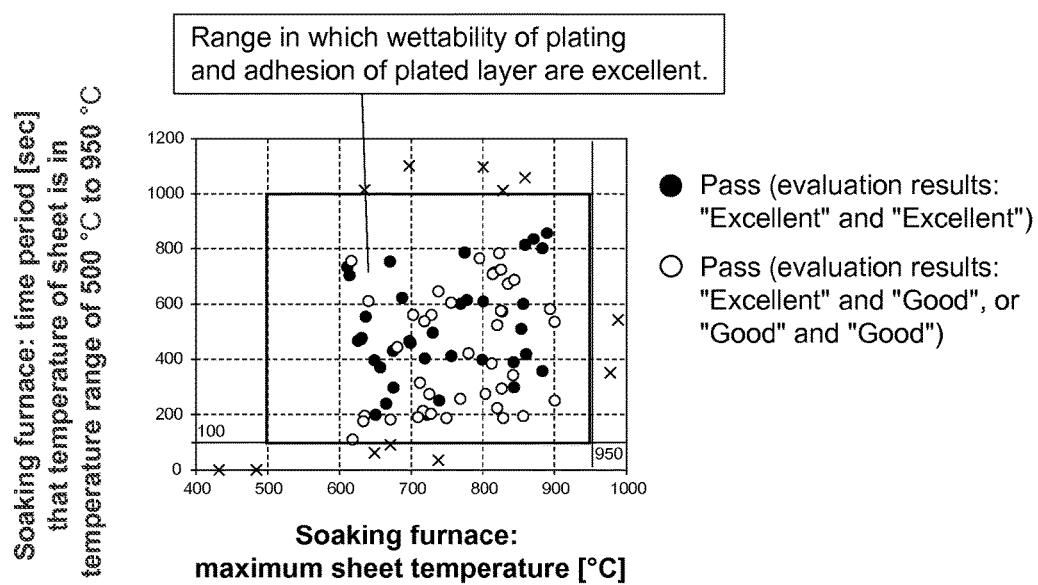

Evaluation results: "Excellent" and "Excellent"
 →Wettability of plating and adhesion of plated layer are both "Excellent".
Evaluation results: "Excellent" and "Good"
 →One of wettability of plating and adhesion of plated layer is
    "Excellent" and the other is "Good".
Evaluation results: "Good" and "Good"
 →Wettability of plating and adhesion of plated layer are both "Good".
Evaluation results: "Good" and "Poor"
 →One of wettability of plating and adhesion of plated layer is
    "Good" and the other is "Poor".
Evaluation results: "Poor" and "Poor"
 →Wettability of plating and adhesion of plated layer are both "Poor".

FIG. 9

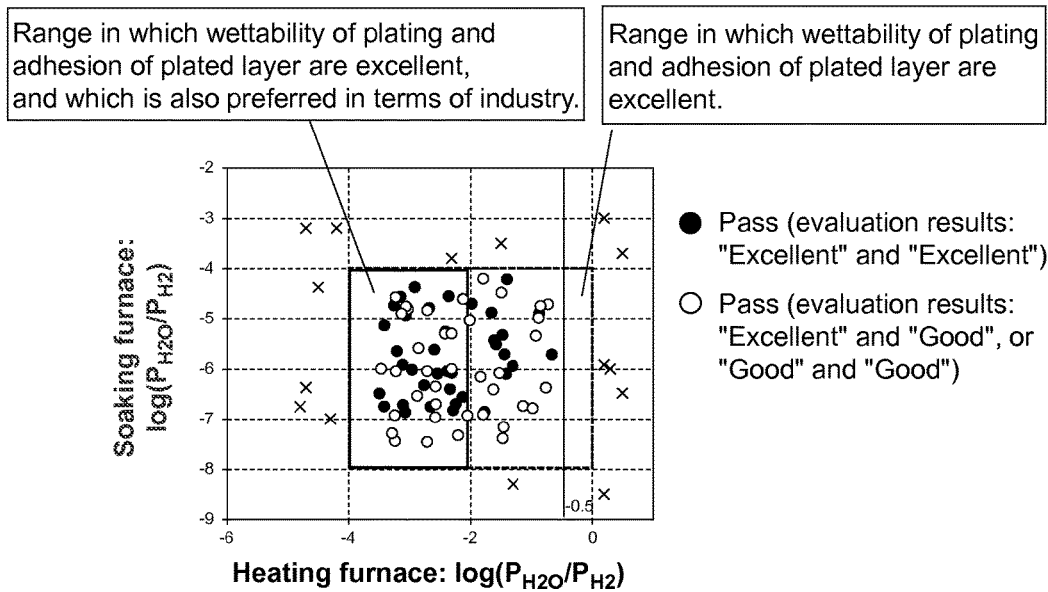

Evaluation results: "Excellent" and "Excellent"
  →Wettability of plating and adhesion of plated layer are both "Excellent".
Evaluation results: "Excellent" and "Good"
  →One of wettability of plating and adhesion of plated layer is
    "Excellent" and the other is "Good".
Evaluation results: "Good" and "Good"
  →Wettability of plating and adhesion of plated layer are both "Good".
Evaluation results: "Good" and "Poor"
  →One of wettability of plating and adhesion of plated layer is
    "Good" and the other is "Poor".
Evaluation results: "Poor" and "Poor"
  →Wettability of plating and adhesion of plated layer are both "Poor".

FIG. 10

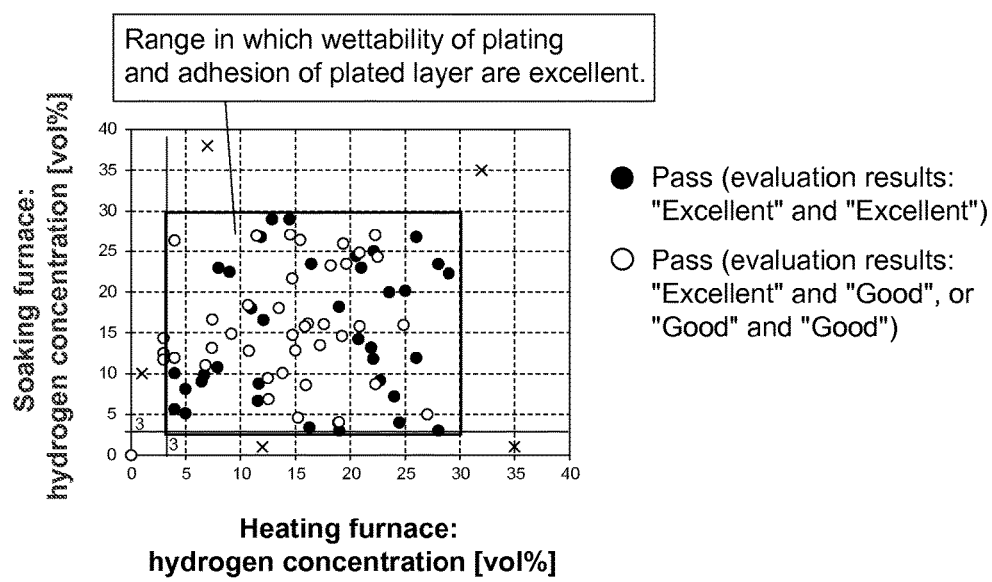

Evaluation results: "Excellent" and "Excellent"
 →Wettability of plating and adhesion of plated layer are both "Excellent".
Evaluation results: "Excellent" and "Good"
   →One of wettability of plating and adhesion of plated layer is
      "Excellent" and the other is "Good".
Evaluation results: "Good" and"Good"
 →Wettability of plating and adhesion of plated layer are both "Good".
Evaluation results: "Good" and "Poor"
   →One of wettability of plating and adhesion of plated layer is
      "Good" and the other is "Poor".
Evaluation results: "Poor" and "Poor"
 →Wettability of plating and adhesion of plated layer are both "Poor".

FIG. 11

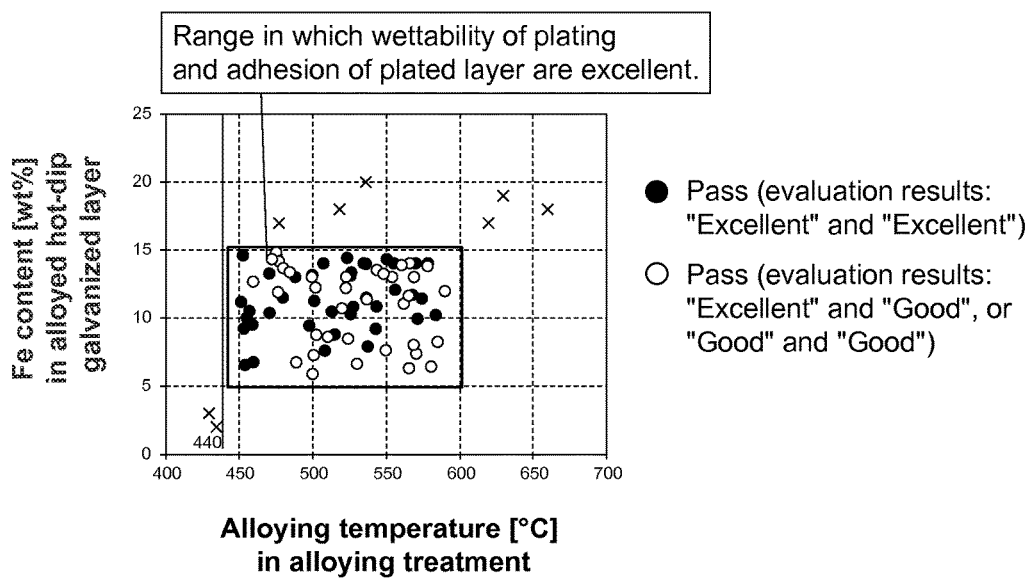

Evaluation results: "Excellent" and "Excellent"
  →Wettability of plating and adhesion of plated layer are both "Excellent".
Evaluation results: "Excellent" and "Good"
  →One of wettability of plating and adhesion of plated layer is
    "Excellent" and the other is "Good".
Evaluation results: "Good" and "Good"
  →Wettability of plating and adhesion of plated layer are both "Good".
Evaluation results: "Good" and "Poor"
  →One of wettability of plating and adhesion of plated layer is
    "Good" and the other is "Poor".
Evaluation results: "Poor" and "Poor"
  →Wettability of plating and adhesion of plated layer are both "Poor".

ALLOYED HOT-DIP GALVANIZED STEEL SHEET AND METHOD OF MANUFACTURING THE SAME

TECHNICAL FIELD

The present invention relates to an alloyed hot-dip galvanized steel sheet and a method of manufacturing the same. In more detail, present invention relates to a high-strength alloyed hot-dip galvanized steel sheet having a tensile strength of 590 MPa or more, including an alloyed hot-dip galvanized layer having excellent wettability of plating and adhesion of plated layer which can be applied as a material used in an automotive field, a household appliance field, and a building material field, and to a method of manufacturing the same.

BACKGROUND ART

In materials used in an automotive field, a household appliance field, and a building material field, a surface treated steel sheet which is imparted with corrosion prevention is being used. In particular, an alloyed hot-dip galvanized steel sheet which can be produced at low cost and is excellent in corrosion prevention is being used.

In general, the alloyed hot-dip galvanized steel sheet is manufactured by the following method using a continuous hot-dip galvanizing plant. First, a slab is hot rolled, cold rolled, or heat treated to obtain a thin-gauge steel sheet. The thin-gauge steel sheet is degreased and/or pickled in a pretreatment step for the purpose of cleaning the surface of the base steel sheet or, omitting the pretreatment step, is heated in a preheating furnace to burn off the oil on the surface of the base steel sheet, then is subjected to heating and recrystallization annealing. The atmosphere at the time of performing the recrystallization annealing is an Fe reducing atmosphere since at the time of the later plating treatment, Fe oxides would obstruct the wettability of the plated layer and the base steel sheet or the adhesion of the plated layer and the base steel sheet. After the recrystallization annealing, without contacting the air, the steel sheet is continuously cooled to a temperature suitable for plating in an Fe reducing atmosphere and dipped in a hot-dip galvanizing bath for hot-dip galvanization. After the hot-dip galvanization, the amount of adhesion of the plating is controlled by immediately performing wiping by nitrogen gas. After that, the heating is performed to thereby conduct an Fe—Zn alloying reaction, and in this way, the alloyed hot-dip galvanized layer is formed on the base steel sheet.

In recent years, in particular in the automotive field, to achieve both the function of protecting the passengers at the time of collision and lighter weight aimed at improvement of the fuel efficiency, use of a high-strength steel sheet which is made higher in strength of the base steel sheet by inclusion of elements which are relatively inexpensive, such as C, Si, and Mn, has been increasing. Regarding the strength, the steel sheet having a tensile strength of 590 MPa or more is mainly used.

However, in the high-strength alloyed hot-dip galvanized steel sheet including Si and Mn, Si and Mn are elements which are more easily oxidizable compared with Fe, so at the time of heating in recrystallization annealing in a conventional Fe-reducing atmosphere, Si and Mn on the surface of the steel sheet oxidize. Further, Si and Mn which thermally diffuse from the inside of the steel sheet oxidize at the steel sheet surface whereby gradually the Si and Mn oxides become concentrated on the surface. If the Si and Mn oxides concentrate at the surface, in the process of dipping the steel sheet in the hot-dip galvanizing bath, contact between the molten zinc and the base steel sheet would be prevented, which would cause a drop in the wettability of plating and the adhesion of plated layer of the alloyed hot-dip galvanized layer. If the plating layer deteriorates in wettability, nonplating defects occur and result in defects in appearance and defects in corrosion prevention. If the adhesion of plated layer deteriorates, peeling of the plating occurs when press forming is performed, and results in problems including defects in corrosion prevention and defects in appearance with press scratches and the like.

Further, in the high-strength alloyed hot-dip galvanized steel sheet containing C, when C is present in a grain boundary or a grain of the base steel sheet in the recrystallization annealing, there is a problem in that the reaction between the molten zinc and the steel sheet in the process of Fe—Zn alloying reaction after dipping the base steel sheet in the hot-dip galvanizing bath is inhibited, to thereby deteriorate the adhesion of plated layer. In addition, there is also a problem in that the inclusion of C in the alloyed hot-dip galvanized layer after the alloying reaction lowers the ductility of the plating, so that peeling of the plating easily occurs when press forming is performed.

Still further, in the high-strength alloyed hot-dip galvanized steel sheet, the ductility deteriorates with the increase in the strength of the base steel sheet, and along therewith, pressing load at the time of performing press forming is large, so that the shear stress applied to the plated layer from a mold at the time of performing forming increases. Accordingly, there is a problem that the plated layer is easily peeled from the interface with the base steel sheet, and results in problems including defects in corrosion prevention and defects in appearance with press scratches and the like.

As measures for the problems attributed to the concentration of oxides of Si and Mn at the time of annealing, there have been proposed various techniques in the past.

As the technique focusing on suppressing concentration of oxides of Si and Mn, Patent Literature 1 shows a method including performing annealing under an oxidizing atmosphere of Si so that the thickness of the oxide film of the steel sheet surface becomes 400 to 10000 Å, then reducing the Fe in the furnace atmosphere containing hydrogen, and performing plating. Further, Patent Literature 2 shows a method including oxidizing the Fe on the steel sheet surface, controlling the oxygen potential in the reducing furnace to thereby reduce the Fe and internally oxidize the Si so as to suppress the concentration of Si oxides on the surface, and then performing plating. However, in those techniques, if the reduction time is too long, Si concentrates at the surface, and if the reduction time is too short, an Fe oxide film remains on the steel sheet surface. Accordingly, there is the problem that issues in the plating layer wettability and the plating layer adhesion are insufficiently resolved. In addition, if Fe oxides are formed on the steel sheet surface inside an annealing furnace, the Fe oxides are deposited on a roll inside the furnace, and with increase in the amount of the deposit, there is a problem that roll pickup is caused, such as defects in appearance with press scratches on the steel sheet.

Patent Literature 3 shows a technique of suppressing the concentration of oxides of Si and Mn on the surface by raising the oxygen potential in the atmosphere in an all radiant tube type annealing furnace and internally oxidizing Si and Mn. Further, Patent Literatures 4 and 5 show methods including carefully controlling the means and conditions for raising the oxygen potential to suppress the surface concentration of both Fe oxides and Si and Mn oxides, and then performing plating. However, none of those techniques are insufficient in suppressing the concentration of oxides of Si and Mn. Further, since internal oxides of Si and Mn formed on the surface of the base steel sheet are present in the vicinity of the surface of the inside of the base steel sheet, there is a problem that the ductility of the base steel sheet deteriorates and the press forming cannot be performed. In addition, when a shear stress is applied to the plated layer at the time of performing the press forming, there is a problem that the plated layer peels from the vicinity of the surface of the inside of the base steel sheet in which the internal oxides are present.

Patent Literature 6 shows a method including raising the hydrogen concentration in the atmosphere in the recrystallization annealing up to the reducing region in which Fe, Si, and Mn do not oxidize, and performing plating. However, in this technique, there is a problem in addition to that the cost of hydrogen becomes immense, that the presence of C on the surface of the base steel sheet deteriorates the adhesion of plated layer as described above, and the remaining Si and Mn obstruct the reaction between the plating and the base steel sheet and form oxides of Si and Mn by being reacted with oxides floating on the surface of the bath at the time of dipping in the plating bath, so the wettability of plating and the adhesion of plated layer deteriorate.

Further, as a technique for suppressing the concentration of oxides of Si and Mn, Patent Literature 7, which focuses on causing internal oxidation in advance in the hot rolling step, shows a technique of controlling the oxygen potential in the hot rolling step so as to cause internal oxidation of Si and using the resultant thin-gauge steel sheet to manufacture a hot-dip galvanized steel sheet in a continuous hot-dip galvanizing plant. However, in this technique, at the time of the cold rolling step and other rolling, the layer of internal oxidation also ends up being rolled together, so the internal oxidation layer becomes smaller in thickness and Si oxides end up concentrating on the surface in the recrystallization annealing process, so there is a problem that the wettability of plating and the adhesion of plated layer are insufficiently improved. Further, there is a problem that oxides of Fe, which are formed simultaneously with internal oxidation of Si in the hot rolling step, cause roll pickup.

Further, the techniques written in Patent Literatures 1 to 7 are insufficient for solving the problem of the adhesion of plated layer related to the deterioration of ductility caused by increase in the strength of the alloyed hot-dip galvanized steel sheet.

PRIOR ART LITERATURE(s)

Patent Literature(s)

[Patent Literature 1] JP S55-122865A
[Patent Literature 2] JP 2001-323355A
[Patent Literature 3] JP 2008-7842A
[Patent Literature 4] JP 2001-279412A
[Patent Literature 5] JP 2009-209397A
[Patent Literature 6] JP 2010-126757A
[Patent Literature 7] JP 2000-309847A

SUMMARY OF THE INVENTION

Problem(s) to be Solved by the Invention

The present invention provides a high-strength alloyed hot-dip galvanized steel sheet including an alloyed hot-dip galvanized layer having excellent wettability of plating and adhesion of plated layer on a base steel sheet containing C, Si, and Mn, and a method of manufacturing the same.

Means for Solving the Problem(s)

In order to solve the problems, the inventors of the present invention have focused on influences on the wettability of plating and the adhesion of plated layer of a content of a ferrite structure, a content of unoxidized Fe, contents of oxides of Fe, Si, and Mn, and a content of C in the steel sheet which is immediately under the base steel sheet in particular, among the alloyed hot-dip galvanized layer and the base steel sheet in the alloyed hot-dip galvanized steel sheet. Further, as the method of manufacturing the alloyed hot-dip galvanized steel sheet, the inventors of the present invention have focused on controlling, in a continuous hot-dip galvanizing plant including a heating furnace and a soaking furnace, a value of a logarithm $\log(P_{H2O}/P_{H2})$ of a value obtained by dividing a partial water vapor pressure $P_{H2O}$ by a partial hydrogen pressure ($P_{H2}$) of an atmosphere in each of the heating furnace and the soaking furnace, in each of the heating furnace and the soaking furnace, and have conducted intensive studies. As a result, the inventors of the present invention have found that a high-strength alloyed hot-dip galvanized steel sheet having excellent wettability of plating and adhesion of plated layer and having a tensile strength of 590 MPa or more can be manufactured, and thus, the present invention has been made.

That is, the gist of the present invention is as follows.

[1]

An alloyed hot-dip galvanized steel sheet including a base steel sheet,
wherein the base steel sheet contains, in mass %,
C: more than or equal to 0.05% and less than or equal to 0.50%,
Si: more than or equal to 0.2% and less than or equal to 3.0%,
Mn: more than or equal to 0.5% and less than or equal to 5.0%,
Al: more than or equal to 0.001 and less than or equal to 1.0%,
P: less than or equal to 0.1%,
S: less than or equal to 0.01%,
N: less than or equal to 0.01%, and
the balance including Fe and inevitable impurities,
wherein the alloyed hot-dip galvanized steel sheet is provided with an alloyed hot-dip galvanized layer on a surface of the base steel sheet, the alloyed hot-dip galvanized layer containing, in mass %, Fe: more than or equal to 5% and less than or equal to 15%, and the balance including Zn and inevitable impurities, and having a thickness of more than or equal to 3 μm and less than or equal to 30 μm, and
wherein the alloyed hot-dip galvanized steel sheet includes an A layer immediately under the surface of the base steel sheet, the A layer being formed in the base steel sheet and having a thickness of more than or equal to 2 μm and less than or equal to 20 μm from the surface of the base steel sheet,
the A layer containing more than or equal to 50 vol % of a ferrite structure based on a volume of the A layer and the balance including inevitable structures, and containing, based on a mass of the A layer, more than or equal to 90 mass % of unoxidized Fe, less than or equal to 10 mass % of a total of contents of oxides of Fe, Si, Mn, P, S, and Al, and less than 0.05 mass % of C.

[2]
The alloyed hot-dip galvanized steel sheet according to [1],
wherein the base steel sheet further contains one or more of, in mass %,
Cr: more than or equal to 0.05% and less than or equal to 1.0%,
Ni: more than or equal to 0.05% and less than or equal to 1.0%,
Cu: more than or equal to 0.05% and less than or equal to 1.0%,
Nb: more than or equal to 0.005% and less than or equal to 0.3%,
Ti: more than or equal to 0.005% and less than or equal to 0.3%,
V: more than or equal to 0.005% and less than or equal to 0.5%,
B: more than or equal to 0.0001% and less than or equal to 0.01%,
Ca: more than or equal to 0.0005% and less than or equal to 0.04%,
Mg: more than or equal to 0.0005% and less than or equal to 0.04%,
La: more than or equal to 0.0005% and less than or equal to 0.04%,
Ce: more than or equal to 0.0005% and less than or equal to 0.04%, and
Y: more than or equal to 0.0005% and less than or equal to 0.04%.

[3]
The alloyed hot-dip galvanized steel sheet according to [1] or [2],
wherein the alloyed hot-dip galvanized layer further contains, in mass %, Al: more than or equal to 0.02% and less than or equal to 1.0%.

[4]
A method of manufacturing an alloyed hot-dip galvanized steel sheet including a base steel material, the base steel material containing, in mass %,
C: more than or equal to 0.05% and less than or equal to 0.50%,
Si: more than or equal to 0.2% and less than or equal to 3.0%,
Mn: more than or equal to 0.5% and less than or equal to 5.0%,
Al: more than or equal to 0.001 and less than or equal to 1.0%,
P: less than or equal to 0.1%,
S: less than or equal to 0.01%,
N: less than or equal to 0.01%, and
the balance including Fe and inevitable impurities,
the method including:
performing casting, hot-rolling, pickling, and cold rolling to thereby produce the base steel material;
subjecting the base steel material to a hot-dip galvanizing treatment by performing, using a continuous hot-dip galvanizing plant equipped with a heating furnace and a soaking furnace, an annealing treatment in which a temperature of the base steel material is increased within a range of higher than or equal to 500° C. and lower than or equal to 950° C. in the heating furnace and the soaking furnace; and
subjecting the base steel material to an alloying treatment at higher than or equal to 440° C. and lower than or equal to 600° C.,
wherein the annealing treatment is performed under the following conditions:
conditions of the heating furnace: an all radiant tube type heating furnace is used, a time period that the temperature of the base steel material is in the range of higher than or equal to 500° C. and lower than or equal to 950° C. is 100 seconds to 1000 seconds, an atmosphere of the heating furnace contains hydrogen, water vapor, and nitrogen, a logarithm log $(P_{H2O}/P_{H2})$ of a value obtained by dividing a partial water vapor pressure $(P_{H2O})$ by a partial hydrogen pressure $(P_{H2})$ is more than or equal to −4.0 and less than −2.0, and a hydrogen concentration is more than or equal to 3 vol % and less than or equal to 30 vol %; and
conditions of the soaking furnace: a time period that the temperature of the base steel material is in the range of higher than or equal to 500° C. and lower than or equal to 950° C. is 100 seconds to 1000 seconds, an atmosphere of the soaking furnace contains hydrogen, water vapor, and nitrogen, a logarithm log $(P_{H2O}/P_{H2})$ of a value obtained by dividing a partial water vapor pressure $(P_{H2O})$ by a partial hydrogen pressure $(P_{H2})$ is more than or equal to −8.0 and less than −4.0, and a hydrogen concentration is more than or equal to 3 vol % and less than or equal to 30 vol %.

[5]
A method of manufacturing the alloyed hot-dip galvanized steel sheet according to [4],
wherein the base steel material further contains one or more of, in mass %,
Cr: more than or equal to 0.05% and less than or equal to 1.0%,
Ni: more than or equal to 0.05% and less than or equal to 1.0%,
Cu: more than or equal to 0.05% and less than or equal to 1.0%,
Nb: more than or equal to 0.005% and less than or equal to 0.3%,
Ti: more than or equal to 0.005% and less than or equal to 0.3%,
V: more than or equal to 0.005% and less than or equal to 0.5%,
B: more than or equal to 0.0001% and less than or equal to 0.01%,
Ca: more than or equal to 0.0005% and less than or equal to 0.04%,
Mg: more than or equal to 0.0005% and less than or equal to 0.04%,
La: more than or equal to 0.0005% and less than or equal to 0.04%,
Ce: more than or equal to 0.0005% and less than or equal to 0.04%, and
Y: more than or equal to 0.0005% and less than or equal to 0.04%.

Effect(s) of the Invention

According to the present invention, there is provided the high-strength alloyed hot-dip galvanized steel sheet including the alloyed hot-dip galvanized layer having excellent wettability of plating and adhesion of plated layer on the base steel sheet containing C, Si, and Mn and having a tensile strength of 590 MPa or more.

BRIEF DESCRIPTION OF THE DRAWING(S)

FIG. 1 is a graph showing a relationship of an Fe content in an alloyed hot-dip galvanized layer and a thickness of the alloyed hot-dip galvanized layer to wettability of plating and adhesion of plated layer, which is obtained from results of Examples and Comparative Examples of the present invention to be described later.

FIG. 2 is a graph showing a relationship of a $\log(P_{H2O}/P_{H2})$ of a heating furnace and a ferrite structure content in an A layer to wettability of plating and adhesion of plated layer, which is obtained from results of Examples and Comparative Examples of the present invention to be described later.

FIG. 3 is a graph showing a relationship of a $\log(P_{H2O}/P_{H2})$ of a soaking furnace and a content of unoxidized Fe in an A layer to wettability of plating and adhesion of plated layer, which is obtained from results of Examples and Comparative Examples of the present invention to be described later.

FIG. 4 is a graph showing a relationship of a $\log(P_{H2O}/P_{H2})$ of a soaking furnace and a total of contents of oxides of Fe, Si, Mn, P, S, and Al in an A layer to wettability of plating and adhesion of plated layer, which is obtained from results of Examples and Comparative Examples of the present invention to be described later.

FIG. 5 is a graph showing a relationship of a $\log(P_{H2O}/P_{H2})$ of a heating furnace and a C content in an A layer to wettability of plating and adhesion of plated layer, which is obtained from results of Examples and Comparative Examples of the present invention to be described later.

FIG. 6 is a graph showing a relationship of a $\log(P_{H2O}/P_{H2})$ of a heating furnace and a thickness of an A layer to wettability of plating and adhesion of plated layer, which is obtained from results of Examples and Comparative Examples of the present invention to be described later.

FIG. 7 is a graph showing a relationship of maximum sheet temperature of a heating furnace and a time period that temperature of a cold-rolled steel sheet is in a range of higher than or equal to 500° C. and lower than or equal to 950° C. in the heating furnace to wettability of plating and adhesion of plated layer, which is obtained from results of Examples and Comparative Examples of the present invention to be described later.

FIG. 8 is a graph showing a relationship of maximum sheet temperature of a soaking furnace and a time period that temperature of a cold-rolled steel sheet is in a range of higher than or equal to 500° C. and lower than or equal to 950° C. in the soaking furnace to wettability of plating and adhesion of plated layer, which is obtained from results of Examples and Comparative Examples of the present invention to be described later.

FIG. 9 is a graph showing a relationship of a $\log(P_{H2O}/P_{H2})$ of a heating furnace and a $\log(P_{H2O}/P_{H2})$ of a soaking furnace to wettability of plating and adhesion of plated layer, which is obtained from results of Examples and Comparative Examples of the present invention to be described later.

FIG. 10 is a graph showing a relationship of a hydrogen concentration in a heating furnace and a hydrogen concentration in a soaking furnace to wettability of plating and adhesion of plated layer, which is obtained from results of Examples and Comparative Examples of the present invention to be described later.

FIG. 11 is a graph showing a relationship of alloying temperature in an alloying treatment and an Fe content in an alloyed hot-dip galvanized layer to wettability of plating and adhesion of plated layer, which is obtained from results of Examples and Comparative Examples of the present invention to be described later.

MODE(S) FOR CARRYING OUT THE INVENTION

Hereinafter, the present invention will be described in detail.

First, let us assume that steel components of the base steel sheet including the alloyed hot-dip galvanized layer according to the present invention are as follows, and in addition, the base steel sheet has a tensile strength of 590 MPa or more. Note that "%" used for the steel components described in the following description represents "mass %" unless otherwise particularly explained.

C: C is an element which can increase the strength of the base steel sheet. However, when the content is less than 0.05%, it is difficult to achieve both of the tensile strength of 590 MPa or more and the workability. On the other hand, when the content exceeds 0.50%, it is difficult to ensure the spot weldability. For this reason, the range is set to more than or equal to 0.05% and less than or equal to 0.50%.

Si: Si is a strengthening element and is effective for increasing the strength of the base steel sheet. Si can suppress precipitation of cementite. When the content is less than 0.2%, the effect of high strengthening is small. On the other hand, when the content exceeds 3.0%, the workability is decreased. Accordingly, the content of Si is set to the range of more than or equal to 0.2% and less than or equal to 3.0%.

Mn: Mn is a strengthening element and is effective for increasing the strength of the base steel sheet. However, when the content is less than 0.5%, it is difficult to obtain the tensile strength of 590 MPa or more. Conversely, when the content is a large quantity, it facilitates co-segregation with P and S and leads to a remarkable deterioration in the workability, and thus the upper limit is 5.0%. Accordingly, the content of Mn is set to the range of more than or equal to 0.5% and less than or equal to 5.0%.

Al: Al promotes the formation of ferrite, and improves the ductility. Al can also act as a deoxidizing material. The effects thereof are insufficient when the content is less than 0.001%. On the other hand, excessive addition increases the number of Al-based coarse inclusions, which can cause the deterioration in hole expandability as well as surface defects. Accordingly, the content of Al is set to more than or equal to 0.001% and less than or equal to 1.0%.

P: P tends to segregate at the center part of thickness of the steel sheet and causes the weld zone to become brittle. When the content exceeds 0.1%, the embrittlement of the weld zone becomes remarkable, so the suitable range is set to less than or equal to 0.1%. That is, P is regarded as an impurity and is limited to less than or equal to 0.1%. The lower limit value of P is not particularly determined, but when the lower limit is less than 0.0001%, it is disadvantageous economically, so this value is preferably set to the lower limit value.

S: S has an adverse effect on the weldability and on the manufacturability at the time of casting and hot rolling. For this reason, the upper limit value is less than or equal to 0.01%. That is, S is regarded as an impurity and is limited to less than or equal to 0.01%. The lower limit value of S is not particularly determined, but when the lower limit is less than 0.0001%, it is disadvantageous economically, so this value is preferably set to the lower limit value. Since S combines with Mn to form coarse MnS, which deteriorates the bendability and the hole expandability, it is preferred that the content of S be reduced as much as possible.

N: N forms is coarse nitrides and causes the deterioration of the bendability and hole expandability, so it is necessary to restrict the additive amount. This is because when the content of N exceeds 0.01%, the above tendency becomes remarkable, so N is regarded as an impurity and the content of N is in a range of less than or equal to 0.01%. The effect of the present invention is exhibited without particularly limiting the lower limit, but when the content of N is less than 0.0005%, the manufacturing cost dramatically increases, so this value is a substantial lower limit.

The base steel sheet according to the present invention may further include, as necessary, one or more selected from the group consisting of Cr, Ni, Cu, Nb, Ti, V, B, Ca, Mg, La, Ce, and Y.

Cr: Cr is a strengthening element and is important for improvement of hardenability. However, when the content is less than 0.05%, these effects cannot be obtained, so, in the case of including Cr, the lower limit value is set to 0.05%. Conversely, when the content exceeds 1.0%, it has an adverse effect on the manufacturability at the time of manufacturing and hot rolling, so the upper limit value is set to 1.0%.

Ni: Ni is a strengthening element and is important for improvement of hardenability. However, when the content is less than 0.05%, these effects cannot be obtained, so, in the case of including Ni, the lower limit value is set to 0.05%. Conversely, when the content exceeds 1.0%, it has an adverse effect on the manufacturability at the time of manufacturing and hot rolling, so the upper limit value is set to 1.0%.

Cu: Cu is a strengthening element and is important for improvement of hardenability. However, when the content is less than 0.05%, these effects cannot be obtained, so, in the case of including Cu, the lower limit value is set to 0.05%. Conversely, when the content exceeds 1.0%, it has an adverse effect on the manufacturability at the time of manufacturing and hot rolling, so the upper limit value is set to 1.0%.

Nb: Nb is a strengthening element. It helps to increase the strength of the base steel sheet through the precipitate strengthening, the grain-refining strengthening due to the growth inhibition of ferrite crystal grains, and the dislocation strengthening due to the inhibition of recrystallization. When the additive amount is less than 0.005%, these effects cannot be obtained, so, in the case of including Nb, the lower limit value is set to 0.005%. When the content exceeds 0.3%, the carbonitride precipitation increases and the formability tends to deteriorate, so the upper limit is set to 0.3%.

Ti: Ti is a strengthening element. It helps to increase the strength of the base steel sheet through precipitate strengthening, grain-refining strengthening due to the growth inhibition of ferrite crystal grains, and dislocation strengthening due to the inhibition of recrystallization. When the additive amount is less than 0.005%, these effects cannot be obtained, so, in the case of including Ti, the lower limit value is set to 0.005%. When the content exceeds 0.3%, carbonitride precipitation increases and the formability tends to deteriorate, so the upper limit is set to 0.3%.

V: V is a strengthening element. It helps to increase the strength of the steel sheet through the precipitate strengthening, the grain-refining strengthening due to the growth inhibition of ferrite crystal grains, and the dislocation strengthening due to the inhibition of recrystallization. When the additive amount is less than 0.005%, these effects cannot be obtained, so, in the case of including V, the lower limit value is set to 0.005%. When the content exceeds 0.5%, the carbonitride precipitation increases and the formability tends to deteriorate, so the upper limit is set to 0.5%.

B: B is effective for grain boundary strengthening and steel strengthening by addition of more than or equal to 0.0001%, but when the additive amount thereof exceeds 0.01%, not only the effect of addition becomes saturated, but the manufacturability at the time of hot rolling is decreased, so the upper limit thereof is set to 0.01%.

Ca, Mg, La, Ce, and Y may each be included more than or equal to 0.0005% and less than or equal to 0.04%. Ca, Mg, La, Ce, and Y are elements used for deoxidation, and it is preferred that the content of each of the elements be more than or equal to 0.0005%. However, when the content exceeds 0.04%, this may cause deterioration of the formability. Accordingly, the content of each of the elements is set to more than or equal to 0.0005% and less than or equal to 0.04%.

Note that, in the present invention, La, Ce, and Y are generally added in a mischmetal, which in addition to La and Ce may also contain other lanthanoid series elements in combination. The effects of the present invention are exhibited even when the lanthanoid series elements other than La and Ce are contained as inevitable impurities. However, the effects of the present invention are exhibited even when metals such as La and Ce are added.

Next, the alloyed hot-dip galvanized layer according to the present invention will be described.

The alloyed hot-dip galvanized layer according to the present invention is formed on a surface of the base steel sheet, which is a substrate, for ensuring corrosion prevention. Accordingly, in the present invention, the lowering of the adhesion of plated layer or the wettability of plating is a disadvantageous problem from the viewpoint of ensuring the corrosion prevention.

As shown in FIG. 1, the alloyed hot-dip galvanized layer includes, in mass %, more than or equal to 5% and less than or equal to 15% of Fe, the balance including Zn and inevitable impurities.

When the Fe content is less than 5%, the amount of an Fe—Zn alloy phase formed in the plated layer is small and the corrosion prevention is insufficient. In addition, since slidability of the surface of the plated layer decreases, base steel sheet fracture or plated layer peeling occurs at the time of performing press forming, and hence, the adhesion of plated layer deteriorates. When the Fe content exceeds 15%, in the Fe—Zn alloy phase formed in the plated layer, a $\Gamma$ phase or a $\Gamma 1$ phase which is poor in ductility is formed with a large thickness. As a result thereof, at the interface between the plated layer and the substrate steel sheet, the plated layer peels at the time of performing press forming, and the corrosion prevention deteriorates. Note that the Fe—Zn alloy phase used here represents all of the following: a $\zeta$ phase ($FeZn_{13}$), a $\delta_1$ phase ($FeZn_7$), a $\Gamma_1$ phase ($Fe_5Zn_{21}$), and a $\Gamma$ phase ($Fe_3Zn_{10}$).

Further, in the present invention, Al may further be included in the plated layer as necessary. With inclusion of more than or equal to 0.02% and less than or equal to 1.0% of Al in the plated layer, the wettability of plating and the adhesion of plated layer can be further enhanced.

A method of analyzing the Fe content per plated layer involves for example: cutting an area of 30 mm×30 mm from the alloyed hot-dip galvanized steel sheet; immersing the cut sample in 5% aqueous solution of hydrochloric acid containing 0.02 vol % of inhibitor (IBIT 700A, manufactured by Asahi Chemical Co., Ltd); dissolving only the alloyed hot-dip galvanized layer; measuring the amount of Fe, the amount of Zn, and the amount of Al of the solution with ICP (ion plasma emission analyzer); and dividing the amount of Fe by the amount of Fe+the amount of Zn+the amount of Al and multiplying the result by 100. In the present invention, the Fe content represents an average of the values determined from five samples which are cut from locations that are spaced apart from each other by 100 mm or more.

As shown in FIG. 1, the alloyed hot-dip galvanized layer has a thickness of more than or equal to 3 μm and less than or equal to 30 μm.

The alloyed hot-dip galvanized layer having the thickness of less than 3 μm is insufficient in the corrosion prevention. In addition, it becomes difficult to uniformly form the plated layer on the base steel sheet, which may cause unplating, for example, and thus, the wettability of plating deteriorates. The alloyed hot-dip galvanized layer having the thickness exceeding 30 μm is not economical, because the effect of enhancing the corrosion prevention by the plated layer saturates. In addition, residual stress inside the plated layer increases, and the adhesion of plated layer deteriorates, for example, the plated layer may be peeled at the time of performing press forming.

Regarding a method of measuring the thickness of the alloyed hot-dip galvanized layer, there are various methods including the microscopic cross-section test method (JIS H 8501). This is a method of burying a cross-section of a sample in a resin, polishing it, then performing etching by a corrosive solution as necessary, and analyzing the polished surface by an optical microscope, a scan type electron microscope (SEM), an electron probe microanalyzer (EPMA), and the like, and finding the thickness. In the present invention, the sample was buried in Technovit 4002 (manufactured by Maruto Instrument Co., Ltd.) and polished in order by #240, #320, #400, #600, #800, and #1000 polishing paper (JIS R 6001), then the polished surface was analyzed by EPMA from the surface of the plated layer to the substrate steel sheet by line analysis. Then, the thickness at which Zn is no longer detected was found at positions of any 10 locations that are spaced apart from each other by 1 mm or more, the found values are averaged, and the obtained value was determined to be the thickness of the alloyed hot-dip galvanized layer.

Subsequently, an A layer, which is important in the present invention, will be described.

The alloyed hot-dip galvanized steel sheet according to the present invention includes the following A layer immediately under the surface of the base steel sheet, the A layer being formed in the base steel sheet and having a thickness of more than or equal to 2 μm and less than or equal to 20 μm from the surface of the base steel sheet.

A layer: including more than or equal to 50 vol % of a ferrite structure based on a volume of the A layer and the balance including inevitable structures, and containing, based on a mass of the A layer, more than or equal to 90 mass % of unoxidized Fe, less than or equal to 10 mass % of a total of contents of oxides of Fe, Si, Mn, P, S, and Al, and less than 0.05 mass % of C.

The A layer according to the present invention is defined by the following measurement method. Since the oxides of Fe, Si, Mn, P, S, and Al are decreased, the A layer is mainly composed of a ferrite structure suppressed in C and excellent in ductility, which is different from a layer including internal oxides of Si and Mn or externally oxidized Si and Mn written in Patent Literatures or the like. Further, the A layer is a layer mainly composed of unoxidized Fe having high reactivity with zinc, and accurately controlled for improving wettability of plating and the adhesion of plated layer. The alloyed hot-dip galvanized steel sheet including the A layer according to the present invention containing C, Si, Mn, and the like has a high-strength of 590 MPa or more, and is excellent in the wettability of plating and the adhesion of plated layer.

As shown in FIG. 2, it is necessary to include more than or equal to 50 vol % of the ferrite structure based on a volume of the A layer for obtaining excellent adhesion of plated layer. The ferrite is a structure excellent in ductility.

As described above, in the alloyed hot-dip galvanized steel sheet, the ductility deteriorates with the increase in strength, and along therewith, pressing load at the time of performing press forming is large, so that the shear stress applied to the plated layer from a mold at the time of performing forming increases. Accordingly, the plated layer is easily peeled from the interface with the base steel sheet, and results in defects in corrosion prevention and defects in appearance with press scratches and the like, which may become a problem related to the deterioration in the adhesion of plated layer. However, in the present invention, since the A layer immediately under the plated layer includes a ferrite structure and is excellent in ductility, the problem is solved. If less than 50 vol % of the ferrite structure is included in the A layer, the improvement in the adhesion of plated layer is insufficient. It is preferred that the A layer include more than or equal to 55 vol % of the ferrite structure. The ferrite phase may include a form of an acicular ferrite in addition to a polygonal ferrite.

The inevitable structures included in the balance represent bainite, martensite, residual austenite, and pearlite.

Note that each phase of the structures such as ferrite, martensite, bainite, austenite, pearlite, and residual structures can be identified and their locations and area fraction can be observed and quantitatively measured using an optical microscope having a magnification of 1000 times and a scanning and transmission electron microscope having a magnification of 1000 times to 100000 times after a cross section of the steel sheet in a rolling direction or a cross section in the right angle direction of the rolling direction is etched using a Nital reagent and the reagent as disclosed in JP 59-219473A. In Examples, the area fraction of the ferrite structure can be obtained by observing 20 or more fields and applying the point-count method or image analysis up to the depth of 2 μm from immediately under the surface of the base steel sheet. Then, the average value is determined as the content based on the volume.

Further, it is necessary that the A layer include, based on a mass of the A layer, more than or equal to 90 mass % of unoxidized Fe, less than or equal to 10 mass % of a total of contents of oxides of Fe, Si, Mn, P, S, and Al, and less than 0.05 mass % of C, for obtaining excellent wettability of plating and adhesion of plated layer.

As described above, in the high-strength alloyed hot-dip galvanized steel sheet including Si and Mn, Si and Mn are elements which are more easily oxidizable compared with Fe, so at the time of heating in recrystallization annealing in a conventional Fe-reducing atmosphere, Si and Mn on the surface of the base steel sheet oxidize. Further, Si and Mn which thermally diffuse from the inside of the base steel sheet oxidize at the surface whereby gradually the Si and Mn oxides become concentrated on the surface. If the Si and Mn oxides concentrate at the surface, in the process of dipping the base steel sheet in the hot-dip galvanizing bath, contact between the molten zinc and the base steel sheet would be prevented, which would cause a problem of a drop in the wettability of plating and the adhesion of plated layer of the alloyed hot-dip galvanized layer. In addition, as described above, the internal oxides of Si and Mn written in Patent Literatures are also present in the vicinity of the surface of the inside of the base steel sheet. Accordingly, there is a problem in that the ductility and the bendability of the base steel sheet are deteriorated and the press forming cannot be performed. Further, when the shear stress is applied to the plated layer at the time of performing the press forming, there is a problem related to the adhesion of plated layer that the plated layer peels from the vicinity of the surface of the inside of the base steel sheet in which the internal oxides are present. However, in the present invention, the A layer immediately under the plated layer is mainly composed of Fe, and the oxides of Fe, Si, Mn, P, S, and Al are decreased, so that the problems are solved. The oxides used here may be any of the internal oxides, or external oxides which concentrate on the surface of the base steel sheet. Examples of the oxides include FeO, $Fe_2O_3$, $Fe_3O_4$, MnO, $MnO_2$, $Mn_2O_3$, $Mn_3O_4$, $SiO_2$, $P_2O_5$, $Al_2O_3$, $SO_2$ as single oxides and respective nonstoichiometric compositions of single oxides, or $FeSiO_3$, $Fe_2SiO_4$, $MnSiO_3$, $Mn_2SiO_4$, $AlMnO_3$, $Fe_2PO_3$, $Mn_2PO_3$ as composite oxides and respective nonstoichiometric compositions of composite oxides.

For the reasons described above, as shown in FIG. 3, the improvement in the wettability of plating and the adhesion of plated layer is insufficient when the content of unoxidized Fe in the A layer is less than 90%. The content of Fe is preferably more than or equal to 92%. Further, as shown in FIG. 4, when the total of the contents of the oxides of Fe, Si, Mn, P, S, and Al exceeds 10%, the improvement in the wettability of plating and the adhesion of plated layer are insufficient. The total of the contents of the oxides of Fe, Si, Mn, P, S, and Al is preferably less than or equal to 8%.

The content of unoxidized Fe in the A layer is determined as follows, for example. The alloyed hot-dip galvanized steel sheet is analyzed in the depth direction using an X-ray photoelectron spectroscope with an ion gun (XPS, PHI5800, manufactured by Ulvac Phi, Inc.), and the content from the depth at which Zn could no longer be detected to the depth of 2 μm further down, which is worked out from a zero-valent Fe spectrum, is averaged by the depth. In the same manner, the total of the contents of the oxides of Fe, Si, Mn, P, S, and Al is determined by finding out the respective contents of Fe, Si, Mn, P, S, and Al from the depths at which Zn could no longer be detected to the depth of 2 μm further down, which are worked out from Fe, Si, Mn, P, S, and Al spectra whose valences are not zero, adding the contents, and then averaging the content by the depth. However, the measurement method is not particularly limited, and the contents may be determined using analysis means as necessary, such as depth direction analysis using glow discharge spectrometry (GDS), secondary ion mass spectrometry (SIMS), and time-of-flight type secondary ion mass spectrometry (TOF-SIMS), and cross-sectional analysis using a transmission electron microscope (TEM) and an electron probe microanalyzer (EPMA).

Further, as described above, in the high-strength alloyed hot-dip galvanized steel sheet containing C, when C is present in a grain boundary or a grain of the base steel sheet in the recrystallization annealing, there is a problem in that the reaction between the molten zinc and the base steel sheet in the process of Fe—Zn alloying reaction after dipping the base steel sheet in the hot-dip galvanizing bath is inhibited, to thereby deteriorate the adhesion of plated layer. In addition, there is also a problem in that the inclusion of C in the alloyed hot-dip galvanized layer after the alloying reaction lowers the ductility of the plating, so that peeling of the plating easily occurs when press forming is performed. However, in the present invention, the content of C in the A layer immediately under the plated layer is extremely reduced, and the problems are solved. For the reasons described above, as shown in FIG. 5, the improvement in the adhesion of plated layer is insufficient when the content of C in the A layer is more than or equal to 0.05%. The content of C in the A layer is less than 0.05%, and is preferably less than or equal to 0.03%.

The content of C in the A layer is determined as follows, for example. The alloyed hot-dip galvanized steel sheet is analyzed in the depth direction using a GDS (GDA750, manufactured by Rigaku Corporation), and the content from the depth at which Zn could no longer be detected to the depth of 2 μm further down is averaged by the depth. However, the measurement method is not particularly limited, and the contents may be determined using analysis means as necessary, such as depth direction analysis using XPS, SIMS, and TOF-SIMS, and cross-sectional analysis using TEM and EPMA.

As shown in FIG. 6, it is necessary that the A layer have a thickness of more than or equal to 2 μm and less than or equal to 20 μm for achieving excellent wettability of plating and adhesion of plated layer. The improvement in the wettability of plating and the adhesion of plated layer is insufficient when the thickness is less than 2 μm, and the strength of the base steel sheet deteriorates when the thickness exceeds 20 μM. The thickness of the A layer is preferably more than or equal to 2 μm and less than or equal to 15 μm.

The thickness of the A layer is determined as follows. That is, vol % of the above-mentioned ferrite structure is measured from immediately under the surface of the base steel sheet, and the depth at which the ferrite structure is less than 50 vol % (depth from immediately under the surface of the base steel sheet) is represented by D1. D2 represents, when the steel sheet is analyzed in the depth direction using an XPS, the depth from the depth at which Zn could no longer be detected to the depth at which the content of Fe is less than 90% determined by the above-mentioned method. D3 represents the depth, which is determined simultaneously with D2 using the XPS, from the depth at which Zn could no longer be detected to the depth at which the total of the contents of Fe, Si, Mn, P, S, and Al in the Fe, Si, Mn, P, S, and Al spectra whose valences are not zero determined by the above-mentioned method exceeds 10%. D4 represents, when the steel sheet is analyzed in the depth direction using a GDS, the depth from the depth at which Zn could no longer be detected to the depth at which the content of C determined by the above-mentioned method is more than or equal to 0.05%. Then, among average values D1(AVE) to D4(AVE) obtained by measuring five points of each of D1 to D4 at positions which are spaced apart from each other by more than or equal to 20 mm and less than or equal to 50 mm, the smallest value is employed as the thickness of the A layer. The thus determined A layer is a layer mainly composed of a ferrite structure containing Fe as a main component, which is decreased in the oxides of Fe, Si, Mn, P, S, and Al, which are external oxides or internal oxides, and is also decreased in C. As long as the A layer has a thickness within the range of the present invention, the A layer is excellent in the wettability of plating and the adhesion of plated layer.

Next, the method of manufacturing the alloyed hot-dip galvanized steel sheet according to the present invention will be described.

The manufacturing method includes subjecting a steel material containing given components to casting, hot-rolling, pickling, and cold rolling, to thereby produce a cold-rolled steel sheet (base steel sheet), subjecting the cold-rolled steel sheet to an annealing treatment in a continuous hot-dip galvanizing plant equipped with a heating furnace and a soaking furnace, and then performing a hot-dip galvanizing treatment and an alloying treatment. In the heating furnace and the soaking furnace in which the annealing treatment is performed, the cold-rolled steel sheet whose temperature is in the range of higher than or equal to 500° C. and lower than or equal to 950° C. while staying in the furnaces is passed under the following conditions, and after that, the cold-rolled steel sheet is subjected to the hot-dip galvanizing treatment and subsequently subjected to the alloying treatment at an alloying heating temperature of higher than or equal to 440° C. and lower than or equal to 600° C. Those conditions are important for manufacturing the alloyed hot-dip galvanized steel sheet excellent in the wettability of plating and the adhesion of plated layer according to the present invention.

Conditions of the heating furnace: an all radiant tube type heating furnace is used, a time period that the temperature of the base steel material is in the range of higher than or equal to 500° C. and lower than or equal to 950° C. is 100 seconds to 1000 seconds, an atmosphere of the heating furnace contains hydrogen, water vapor, and nitrogen, a logarithm $\log(P_{H2O}/P_{H2})$ of a value obtained by dividing a partial water vapor pressure $(P_{H2O})$ by a partial hydrogen pressure $(P_{H2})$ is more than or equal to −4.0 and less than −2.0, and a hydrogen concentration is more than or equal to 3 vol % and less than or equal to 30 vol %.

Conditions of the soaking furnace: a time period that the temperature of the base steel material is in the range of higher than or equal to 500° C. and lower than or equal to 950° C. is 100 seconds to 1000 seconds, an atmosphere of the soaking furnace contains hydrogen, water vapor, and nitrogen, a logarithm $\log(P_{H2O}/P_{H2})$ of a value obtained by dividing a partial water vapor pressure $(P_{H2O})$ by a partial hydrogen pressure $(P_{H2})$ is more than or equal to −8.0 and less than −4.0, and a hydrogen concentration is more than or equal to 3 vol % and less than or equal to 30 vol %.

In the manufacturing method according to the present invention, the annealing treatment and the treatment of providing the plated layer is performed in the continuous hot-dip galvanizing plant equipped with the all radiant tube type heating furnace. An all radiant tube type heating furnace is resistant to roll pickup and is good in productivity of the annealing treatment.

As shown in FIG. 7 and FIG. 8, regarding the conditions of the heating furnace and the conditions of the soaking furnace, it is necessary that maximum sheet temperature of the passing cold-rolled steel sheet be higher than or equal to 500° C. and lower than or equal to 950° C. for manufacturing the alloyed hot-dip galvanized steel sheet according to the present invention. When the temperature is lower than 500° C., the tensile strength of the base steel sheet is lower than 590 MPa. In addition, naturally oxidized Fe on the surface of the base steel sheet remains after the annealing, to thereby deteriorate the wettability of plating and the adhesion of plated layer. When the temperature exceeds 950° C., excessive thermal energy is required, which is not economical. Further, since the volume fraction of ferrite decreases and the oxides of Si and Mn are excessively formed, the wettability of plating and the adhesion of plated layer deteriorate. The temperature is preferably higher than or equal to 600° C. and lower than or equal to 850° C.

In the heating furnace, a $\log(P_{H2O}/P_{H2})$ of the atmosphere in the furnace is increased to oxidize C, Si, Mn, P, S, and Al on the surface of the base steel sheet. If C is oxidized, C detaches from the base steel sheet as carbon monoxide or carbon dioxide, and hence, the C content on the surface of the base steel sheet can be decreased. Further, Si, Mn, P, S, and Al are internally oxidized immediately under the surface of the base steel sheet. At that time, by controlling the level of the $\log(P_{H2O}/P_{H2})$ appropriately, the oxidation of Fe can be suppressed. Accordingly, the excellent wettability of plating and adhesion of plated layer can be obtained.

As shown in FIG. 7, in the heating furnace, the time period that the temperature of the base steel material is in the range of higher than or equal to 500° C. and lower than or equal to 950° C. is 100 seconds to 1000 seconds. When the time period is less than 100 seconds, the decreased amount of the C content and the amount of internally oxidized Si, Mn, P, S, and Al are small, and hence, the wettability of plating and the adhesion of plated layer deteriorate. When the time period exceeds 1000 seconds, the productivity deteriorates, and the C content is excessively decreased to cause lowering in the tensile strength and to deteriorate the adhesion of plated layer due to excessive internal oxidization and generation of internal stress.

As shown in FIG. 9, in the heating furnace, the atmosphere in which the base steel sheet is in the range of higher than or equal to 500° C. and lower than or equal to 950° C. contains hydrogen, water vapor, and nitrogen, and a logarithm $\log(P_{H2O}/P_{H2})$ of a value obtained by dividing a partial water vapor pressure $(P_{H2O})$ by a partial hydrogen pressure $(P_{H2})$ is more than or equal to −4.0 and less than −2.0. When the $\log(P_{H2O}/P_{H2})$ is less than −4.0, the oxidation reaction of C does not sufficiently proceed, and hence, the wettability of plating and the adhesion of plated layer deteriorate. When the $\log(P_{H2O}/P_{H2})$ exceeds 0.0, since Fe oxides excessively form on the surface of the steel sheet, the wettability of plating and the adhesion of plated layer deteriorate. In addition, C in the base material is oxidized and excessively detaches from the base material, which causes lowering in the tensile strength of the base material, and internal stress of the steel sheet increases due to excessive internal oxidization of Si, Mn, P, S, and Al, which causes deterioration in the adhesion of plated layer. When the $\log(P_{H2O}/P_{H2})$ is less than or equal to 0.0, those problems can be avoided, but when the $\log(P_{H2O}/P_{H2})$ is more than or equal to −2.0, the deterioration of a lining of the heating furnace (normally manufactured by SUS Corporation) becomes noticeable, which is not preferable in terms of industry. Accordingly, in the present invention, the $\log(P_{H2O}/P_{H2})$ in the heating furnace is in the range of less than −2.0.

As shown in FIG. 10, the hydrogen concentration in the atmosphere of the heating furnace is more than or equal to 3 vol % and less than or equal to 30 vol %. When the hydrogen concentration is less than 3 vol %, it is difficult to control the hydrogen concentration and the $\log(P_{H2O}/P_{H2})$ varies widely within the furnace. Therefore, the wettability of plating and the adhesion of plated layer deteriorate. When the hydrogen concentration exceeds 30 vol %, the amount of hydrogen to be fed increases, which is not economical. In addition, hydrogen enters inside the steel sheet whereby hydrogen embrittlement occurs, and the steel sheet strength and the adhesion of plated layer deteriorate.

Rate of temperature rise of the sheet in the heating furnace is not particularly limited. However, if the rate is too slow, the productivity deteriorates, and if the rate is too fast, the cost required for the heating plant becomes expensive. Accordingly, the rate is preferably more than or equal to 0.5° C./s and less than or equal to 20° C./s.

Initial temperature of the sheet at the time of entering into the heating furnace is not particularly limited. However, if the temperature is too high, Fe oxides are excessively formed on the base steel sheet and the wettability of plating and the adhesion of plated layer deteriorate, and if the temperature is too low, cost required for the cooling becomes expensive. Accordingly, the temperature is preferably higher than or equal to 0° C. and lower than or equal to 200° C.

Subsequently, conditions of the soaking furnace continued from the heating furnace will be described.

In the soaking furnace, a $\log(P_{H2O}/P_{H2})$ of the atmosphere in the furnace is decreased to reduce the oxides that are formed by the internal oxidization and external oxidization of Si, Mn, P, S, and Al immediately under the surface of the base steel sheet formed in the heating furnace. With sufficient reduction, the excellent wettability of plating and adhesion of plated layer can be obtained.

As shown in FIG. 8, in the soaking furnace, the time period that the temperature of the steel sheet is in the range of higher than or equal to 500° C. and lower than or equal to 950° C. is 100 seconds to 1000 seconds. When the time period is less than 100 seconds, the reduction of the oxides of Si, Mn, P, S, and Al is insufficient, and hence, the wettability of plating and the adhesion of plated layer deteriorate. When the time period exceeds 1000 seconds, the productivity deteriorates, and the C content immediately under the surface of the base steel sheet increases by thermal diffusion of C. Accordingly, the wettability of plating and the adhesion of plated layer deteriorate.

As shown in FIG. 9, in the soaking furnace, the atmosphere in which the steel sheet is in the range of higher than or equal to 500° C. and lower than or equal to 950° C. contains hydrogen, water vapor, and nitrogen, and a logarithm $\log(P_{H2O}/P_{H2})$ of a value obtained by dividing a partial water vapor pressure ($P_{H2O}$) by a partial hydrogen pressure ($P_{H2}$) is more than or equal to −8.0 and less than −4.0. When the $\log(P_{H2O}/P_{H2})$ is less than −8.0, in addition to that it is poor in industrial practicality, in the case where ceramics are used for the furnace body, the ceramics are reduced and lower the lifetime of the furnace. When the $\log(P_{H2O}/P_{H2})$ is more than or equal to −4.0, the reduction of Si, Mn, P, S, and Al is insufficient, and Si, Mn, and Al externally oxidize, so that the wettability of plating and the adhesion of plated layer deteriorate. In addition, C in the base steel sheet detaches from the base steel sheet by an oxidation reaction, which causes lowering in the tensile strength of the base steel sheet. The $\log(P_{H2O}/P_{H2})$ of the atmosphere of the soaking furnace is more preferably more than or equal to −7.0 and less than −4.0.

As shown in FIG. 10, the hydrogen concentration in the atmosphere of the soaking furnace is more than or equal to 3 vol % and less than or equal to 30 vol %. When the hydrogen concentration is less than 3 vol %, it is difficult to control the hydrogen concentration, and the $\log(P_{H2O}/P_{H2})$ varies widely within the furnace, so that the wettability of plating and the adhesion of plated layer deteriorate. When the hydrogen concentration exceeds 30 vol %, the amount of hydrogen to be fed increases, which is not economical. In addition, hydrogen enters inside the steel sheet whereby hydrogen embrittlement occurs, and the steel sheet strength and the adhesion of plated layer deteriorate.

Individual control of the atmospheric conditions in the heating furnace and the soaking furnace of the continuous hot-dip galvanizing plant is a characteristic feature of the method of manufacturing the hot-dip galvanized steel sheet of the present invention. For individual control, it is necessary to charge the furnaces with nitrogen, water vapor, and hydrogen while controlling the concentrations thereof. Further, the $\log(P_{H2O}/P_{H2})$ of the oxygen potential in the heating furnace has to be higher than the $\log(P_{H2O}/P_{H2})$ of the oxygen potential in the soaking furnace. For this reason, when gas flows from the heating furnace toward the soaking furnace, an additional atmosphere of a higher hydrogen concentration or lower water vapor concentration than the inside of the heating furnace may be introduced from between the heating furnace and the soaking furnace toward the soaking furnace. When gas flows from the soaking furnace toward the heating furnace, an additional atmosphere of a lower hydrogen concentration or higher water vapor concentration than the inside of the soaking furnace may be introduced from between the heating furnace and soaking furnace toward the heating furnace.

After the base steel sheet leaves the heating furnace and the soaking furnace, the base steel sheet can be run through the general ordinary steps until being dipped in the hot-dip galvanizing bath. For example, the base steel sheet can be run through a slow cooling step, a rapid cooling step, an overaging step, a second cooling step, a water quench step, a reheating step, and the like alone or in any combination. It is also possible to similarly run the base steel sheet through general ordinary steps after dipping in a hot-dip galvanizing bath.

The base steel sheet is run through the heating furnace and the soaking furnace, then is cooled and, in accordance with need, held in temperature, is dipped in a hot-dip galvanizing bath where it is hot-dip galvanized, then is subjected to alloying treatment in accordance with need.

With hot-dip galvanizing treatment, it is preferred to use a hot-dip galvanizing bath which has a bath temperature of higher than or equal to 440° C. and lower than 550° C., a concentration of Al in the bath of more than or equal to 0.08% and less than or equal to 0.24%, and inevitable impurities.

When the bath temperature is lower than 440° C., the molten zinc in the bath may solidify, so it becomes difficult to control the amount of adhesion of the plating. When the bath temperature exceeds 550° C., the evaporation of the molten zinc at the bath surface becomes immense, the operating cost rises, and vaporized zinc sticks to the inside of the furnace, so there are problems in operation.

When the hot-dip galvanized steel sheet is subjected to the plating treatment, if the concentration of Al in the bath becomes less than 0.08%, a large amount of layer is formed and the adhesion of plated layer deteriorates, while if the concentration of Al in the bath exceeds 0.24%, the Al which oxidizes in the bath or on the bath increases and the wettability of plating deteriorates.

As shown in FIG. 11, when performing hot-dip galvanizing treatment, then alloying treatment, it is necessary that the alloying treatment be performed at higher than or equal to 440° C. and lower than or equal to 600° C. When the temperature is lower than 440° C., the alloying proceeds slowly. When the temperature exceeds 600° C., due to overalloying, a hard, brittle Zn—Fe alloy layer is overly formed at the interface with the base steel sheet, and the adhesion of plated layer deteriorates. Further, when the temperature exceeds 600° C., the residual austenite phase of the base steel sheet breaks down, so the balance of strength and ductility of the base steel sheet also deteriorates.

EXAMPLES

Hereinafter, the present invention will be specifically described by way of Examples.

Test materials 1 to 94, which are shown in Tables 1 (Table 1-1, Table 1-2), were prepared, the test materials 1 to 94 having been subjected to the usual casting, hot-rolling, pickling, and cold rolling, and each being a cold-rolled steel sheet (base steel sheet) having a thickness of 1 mm. Some of the test materials 1 to 94 were appropriately selected and were subjected to an annealing treatment, a hot-dip galvanizing treatment, and an alloying treatment under the conditions of Tables 2 and Tables 3, in a continuous hot-dip galvanizing plant equipped with an all radiant tube type heating furnace of a relatively high productivity heating method with little roll pickup as explained above. By using an all radiant tube type of furnace, as explained above, there is little roll pickup and the productivity is also good.

After the soaking furnace, the base steel sheet was treated by general slow cooling, rapid cooling, overaging, and second cooling steps and then was dipped in a hot-dip galvanizing bath. The hot-dip galvanizing bath had a plating bath temperature of 460° C. and contained 0.13% of Al and 0.03% of Fe in addition to Zn. After the base steel sheet was dipped in the hot-dip galvanizing bath, the base steel sheet was wiped by nitrogen gas to adjust the plating thickness. After that, the base steel sheet was subjected to an alloying treatment by being heated in an alloying furnace for 30 seconds. The obtained alloyed hot-dip galvanized steel sheet was evaluated for wettability of plating and adhesion of plated layer. Tables 2 show the results of Examples, and Tables 3 show results of Comparative Examples.

The wettability of plating was evaluated by mapping Zn and Fe on any 200 μm×200 μm area of 10 locations that are spaced apart from each other by 1 mm or more on the surface of the plated steel sheet of the alloyed hot-dip galvanized steel sheet by EPMA. The wettability of plating was evaluated as follows. Regarding the case where there is no Zn and Fe is exposed, the case where there are four or more locations out of 10 locations was evaluated as poor in the wettability of plating (Poor), the case where there are one to three locations out of 10 locations was evaluated as good in the wettability of plating (Good), and the case where no such location was evaluated as excellent in the wettability of plating (Excellent). "Good" and "Excellent" were each evaluated as pass in the wettability of plating and "Poor" was evaluated as fail in the wettability of plating.

The adhesion of plated layer was measured by a powdering test. The case where a peeled length exceeds 2 mm was evaluated as poor in the adhesion of plated layer (Poor), the case where a peeled length was less than or equal to 2 mm and more than 1 mm was evaluated as good in the adhesion of plated layer (Good), and the case where a peeled length was less than or equal to 1 mm was evaluated as excellent in the adhesion of plated layer (Excellent). The powdering test is a method of examination of adhesion involving sticking Cellotape (registered trademark) to the alloyed hot-dip galvanized steel sheet, bending the tape surface at R=1, 90° C., unbending the tape, then peeling off the tape, and measuring the peeled length of the alloyed hot-dip galvanized steel sheet.

A tensile test was performed by sampling a JIS No. 5 test piece from an alloyed hot-dip galvanized steel sheet having a thickness of 1.0 mm in directions vertical to and parallel to the rolling direction to evaluate tensile properties. The tensile test was performed on each of five test pieces in the vertical direction and in the parallel direction, and an average value of the results was determined as a tensile strength (TS). Note that, as for a steel sheet having large material anisotropy, there was a tendency that the elongation values varied.

As shown in Tables 2 (Table 2-1, Table 2-2, Table 2-3, and Table 2-4) and Tables 3 (Table 3-1 and Table 3-2), it was found out that the wettability of plating and the adhesion of plated layer of Examples (Tables 2) according to the present invention were excellent compared to Comparative Examples (Tables 3). Note that, when the $\log(P_{H2O}/P_{H2})$ in the heating furnace is in the range of more than or equal to −4.0 and less than or equal to 0.0, the wettability of plating and the adhesion of plated layer were better compared to Comparative Example, but when the $\log(P_{H2O}/P_{H2})$ is more than or equal to −2.0, the deterioration of a lining of the heating furnace (normally manufactured by SUS Corporation) became noticeable.

TABLE 1-1

| No. | Composition [wt %] | | | | | | | Other selected element(s) |
|---|---|---|---|---|---|---|---|---|
| | C | Si | Mn | P | S | Al | N | |
| Test material 1 | 0.06 | 0.5 | 2.5 | 0.050 | 0.004 | 0.20 | 0.002 | |
| Test material 2 | 0.06 | 0.5 | 3.5 | 0.050 | 0.004 | 0.20 | 0.002 | |
| Test material 3 | 0.06 | 0.3 | 4.5 | 0.050 | 0.004 | 0.20 | 0.002 | |
| Test material 4 | 0.06 | 1.0 | 2.5 | 0.050 | 0.004 | 0.20 | 0.002 | |
| Test material 5 | 0.06 | 1.0 | 3.5 | 0.050 | 0.004 | 0.20 | 0.002 | |
| Test material 6 | 0.06 | 1.0 | 4.5 | 0.050 | 0.004 | 0.20 | 0.002 | |
| Test material 7 | 0.06 | 1.5 | 0.5 | 0.050 | 0.004 | 0.20 | 0.002 | |
| Test material 8 | 0.06 | 1.5 | 3.5 | 0.050 | 0.004 | 0.20 | 0.002 | |
| Test material 9 | 0.06 | 1.5 | 4.5 | 0.050 | 0.004 | 0.20 | 0.002 | |
| Test material 10 | 0.06 | 2.5 | 0.5 | 0.050 | 0.004 | 0.20 | 0.002 | |
| Test material 11 | 0.06 | 2.5 | 1.5 | 0.050 | 0.004 | 0.20 | 0.002 | |
| Test material 12 | 0.06 | 2.5 | 2.5 | 0.050 | 0.004 | 0.20 | 0.002 | |
| Test material 13 | 0.06 | 2.5 | 3.5 | 0.050 | 0.004 | 0.20 | 0.002 | |
| Test material 14 | 0.06 | 2.5 | 4.5 | 0.050 | 0.004 | 0.20 | 0.002 | |
| Test material 15 | 0.1 | 0.5 | 0.5 | 0.005 | 0.001 | 0.04 | 0.002 | |
| Test material 16 | 0.1 | 0.5 | 1.5 | 0.005 | 0.001 | 0.04 | 0.002 | |
| Test material 17 | 0.1 | 0.5 | 2.5 | 0.005 | 0.001 | 0.04 | 0.002 | |
| Test material 18 | 0.1 | 0.5 | 3.5 | 0.005 | 0.001 | 0.04 | 0.002 | |
| Test material 19 | 0.1 | 0.5 | 4.5 | 0.005 | 0.001 | 0.04 | 0.002 | |
| Test material 20 | 0.1 | 1.0 | 0.5 | 0.005 | 0.001 | 0.04 | 0.002 | |
| Test material 21 | 0.1 | 1.0 | 1.5 | 0.005 | 0.001 | 0.04 | 0.002 | |
| Test material 22 | 0.1 | 1.0 | 2.5 | 0.005 | 0.001 | 0.04 | 0.002 | |
| Test material 23 | 0.1 | 1.0 | 3.5 | 0.005 | 0.001 | 0.04 | 0.002 | |
| Test material 24 | 0.1 | 1.0 | 4.5 | 0.005 | 0.001 | 0.04 | 0.004 | |
| Test material 25 | 0.1 | 1.5 | 0.5 | 0.005 | 0.001 | 0.04 | 0.004 | |
| Test material 26 | 0.1 | 1.5 | 1.5 | 0.005 | 0.001 | 0.04 | 0.004 | |
| Test material 27 | 0.1 | 1.5 | 2.5 | 0.005 | 0.001 | 0.04 | 0.004 | |
| Test material 28 | 0.1 | 1.5 | 3.5 | 0.005 | 0.001 | 0.04 | 0.004 | |

TABLE 1-1-continued

| No. | C | Si | Mn | P | S | Al | N | Other selected element(s) |
|---|---|---|---|---|---|---|---|---|
| | | | | Composition [wt %] | | | | |
| Test material 29 | 0.1 | 1.5 | 4.5 | 0.005 | 0.001 | 0.04 | 0.004 | |
| Test material 30 | 0.1 | 2.5 | 0.5 | 0.005 | 0.001 | 0.04 | 0.004 | |
| Test material 31 | 0.1 | 2.5 | 1.5 | 0.005 | 0.001 | 0.04 | 0.004 | |
| Test material 32 | 0.1 | 2.5 | 2.5 | 0.005 | 0.001 | 0.04 | 0.004 | |
| Test material 33 | 0.1 | 2.5 | 3.5 | 0.005 | 0.001 | 0.04 | 0.004 | |
| Test material 34 | 0.1 | 2.5 | 4.5 | 0.005 | 0.001 | 0.04 | 0.002 | |
| Test material 35 | 0.2 | 0.5 | 0.5 | 0.001 | 0.0005 | 0.01 | 0.002 | |
| Test material 36 | 0.2 | 0.3 | 1.5 | 0.001 | 0.0005 | 0.01 | 0.002 | |
| Test material 37 | 0.2 | 0.3 | 2.5 | 0.001 | 0.0005 | 0.01 | 0.002 | |
| Test material 38 | 0.2 | 0.5 | 3.5 | 0.001 | 0.0005 | 0.01 | 0.002 | |
| Test material 39 | 0.2 | 0.5 | 4.5 | 0.001 | 0.0005 | 0.01 | 0.002 | |
| Test material 40 | 0.2 | 1.0 | 0.5 | 0.001 | 0.0005 | 0.01 | 0.002 | |
| Test material 41 | 0.2 | 1.0 | 1.5 | 0.001 | 0.0005 | 0.01 | 0.002 | |
| Test material 42 | 0.2 | 1.0 | 2.5 | 0.001 | 0.0005 | 0.01 | 0.002 | |
| Test material 43 | 0.2 | 1.0 | 3.5 | 0.001 | 0.0005 | 0.01 | 0.002 | |
| Test material 44 | 0.2 | 1.0 | 4.5 | 0.001 | 0.0005 | 0.01 | 0.002 | |
| Test material 45 | 0.2 | 1.5 | 0.5 | 0.001 | 0.0005 | 0.01 | 0.002 | |
| Test material 46 | 0.2 | 1.5 | 1.5 | 0.001 | 0.0005 | 0.01 | 0.002 | |
| Test material 47 | 0.2 | 1.5 | 2.5 | 0.001 | 0.0005 | 0.01 | 0.002 | |

TABLE 1-2

| No. | C | Si | Mn | P | S | Al | N | Other selected element(s) |
|---|---|---|---|---|---|---|---|---|
| | | | | Composition [wt %] | | | | |
| Test material 48 | 0.2 | 1.5 | 3.5 | 0.001 | 0.0005 | 0.01 | 0.002 | |
| Test material 49 | 0.2 | 1.5 | 4.5 | 0.001 | 0.0005 | 0.01 | 0.002 | |
| Test material 50 | 0.2 | 2.5 | 0.5 | 0.001 | 0.0005 | 0.01 | 0.002 | |
| Test material 51 | 0.2 | 2.5 | 1.5 | 0.001 | 0.0005 | 0.01 | 0.002 | |
| Test material 52 | 0.2 | 2.5 | 2.5 | 0.001 | 0.0005 | 0.01 | 0.002 | |
| Test material 53 | 0.2 | 2.5 | 3.5 | 0.001 | 0.0005 | 0.01 | 0.002 | |
| Test material 54 | 0.2 | 2.5 | 4.5 | 0.001 | 0.0005 | 0.01 | 0.002 | |
| Test material 55 | 0.4 | 0.5 | 0.5 | 0.001 | 0.001 | 0.005 | 0.002 | |
| Test material 56 | 0.4 | 0.5 | 1.5 | 0.001 | 0.001 | 0.005 | 0.002 | |
| Test material 57 | 0.4 | 0.5 | 2.5 | 0.001 | 0.001 | 0.005 | 0.002 | |
| Test material 58 | 0.4 | 0.5 | 3.5 | 0.001 | 0.001 | 0.005 | 0.002 | |
| Test material 59 | 0.4 | 0.5 | 4.5 | 0.001 | 0.001 | 0.005 | 0.002 | |
| Test material 60 | 0.4 | 1.0 | 0.5 | 0.001 | 0.001 | 0.005 | 0.002 | |
| Test material 61 | 0.4 | 1.0 | 1.5 | 0.001 | 0.001 | 0.005 | 0.002 | |
| Test material 62 | 0.4 | 1.0 | 2.5 | 0.001 | 0.001 | 0.005 | 0.002 | |
| Test material 63 | 0.4 | 1.0 | 3.5 | 0.001 | 0.001 | 0.005 | 0.002 | |
| Test material 64 | 0.4 | 1.0 | 4.5 | 0.001 | 0.001 | 0.005 | 0.002 | |
| Test material 65 | 0.4 | 1.5 | 0.5 | 0.001 | 0.001 | 0.005 | 0.002 | |
| Test material 66 | 0.4 | 1.5 | 1.5 | 0.001 | 0.001 | 0.005 | 0.002 | |
| Test material 67 | 0.4 | 1.5 | 2.5 | 0.001 | 0.001 | 0.005 | 0.002 | |
| Test material 68 | 0.4 | 1.5 | 3.5 | 0.001 | 0.001 | 0.005 | 0.002 | |
| Test material 69 | 0.4 | 1.5 | 4.5 | 0.001 | 0.001 | 0.005 | 0.002 | |
| Test material 70 | 0.4 | 2.5 | 0.5 | 0.001 | 0.001 | 0.005 | 0.002 | |
| Test material 71 | 0.4 | 2.5 | 1.5 | 0.001 | 0.001 | 0.005 | 0.002 | |
| Test material 72 | 0.4 | 2.5 | 2.5 | 0.001 | 0.001 | 0.005 | 0.002 | |
| Test material 73 | 0.4 | 2.5 | 3.5 | 0.001 | 0.001 | 0.005 | 0.002 | |
| Test material 74 | 0.4 | 2.5 | 4.5 | 0.001 | 0.001 | 0.005 | 0.002 | |
| Test material 75 | 0.2 | 1.5 | 2.5 | 0.005 | 0.001 | 0.04 | 0.002 | Cr: 0.2 |
| Test material 76 | 0.2 | 1.5 | 2.5 | 0.005 | 0.001 | 0.04 | 0.002 | Ni: 0.2 |
| Test material 77 | 0.2 | 1.5 | 2.5 | 0.005 | 0.001 | 0.04 | 0.002 | Cu: 0.2 |
| Test material 78 | 0.2 | 1.5 | 2.5 | 0.005 | 0.001 | 0.04 | 0.002 | Nb: 0.02 |
| Test material 79 | 0.2 | 1.5 | 2.5 | 0.005 | 0.001 | 0.04 | 0.002 | Ti: 0.02 |
| Test material 80 | 0.2 | 1.5 | 2.5 | 0.005 | 0.001 | 0.04 | 0.002 | V: 0.02 |
| Test material 81 | 0.2 | 1.5 | 2.5 | 0.005 | 0.001 | 0.04 | 0.002 | B: 0.002 |
| Test material 82 | 0.2 | 1.5 | 2.5 | 0.005 | 0.001 | 0.04 | 0.002 | Ca: 0.002 |
| Test material 83 | 0.2 | 1.5 | 2.5 | 0.005 | 0.001 | 0.04 | 0.002 | Mg: 0.002 |
| Test material 84 | 0.2 | 1.5 | 2.5 | 0.005 | 0.001 | 0.04 | 0.002 | La: 0.002 |
| Test material 85 | 0.2 | 1.5 | 2.5 | 0.005 | 0.001 | 0.04 | 0.002 | Ce: 0.002 |
| Test material 86 | 0.2 | 1.5 | 2.5 | 0.005 | 0.001 | 0.04 | 0.002 | Y: 0.002 |
| Test material 87 | 0.2 | 1.5 | 2.5 | 0.005 | 0.001 | 0.04 | 0.002 | Cr: 0.1, Ni: 0.1 |
| Test material 88 | 0.2 | 1.5 | 2.5 | 0.005 | 0.001 | 0.04 | 0.002 | Cr: 0.1, B: 0.005 |
| Test material 89 | 0.2 | 1.5 | 2.5 | 0.005 | 0.001 | 0.04 | 0.002 | Cu: 0.1, Mg: 0.001 |
| Test material 90 | 0.2 | 1.5 | 2.5 | 0.005 | 0.001 | 0.04 | 0.002 | Nb: 0.001, Ti: 0.001 |
| Test material 91 | 0.2 | 1.5 | 2.5 | 0.005 | 0.001 | 0.04 | 0.002 | V: 0.01, La: 0.001 |
| Test material 92 | 0.2 | 1.5 | 2.5 | 0.005 | 0.001 | 0.04 | 0.002 | Cr: 0.5, Ce: 0.001 |

TABLE 1-2-continued

| | Composition [wt %] | | | | | | | |
|---|---|---|---|---|---|---|---|---|
| No. | C | Si | Mn | P | S | Al | N | Other selected element(s) |
| Test material 93 | 0.2 | 1.5 | 2.5 | 0.005 | 0.001 | 0.04 | 0.002 | Cr: 0.1, Ti: 0.001, B: 0.0005 |
| Test material 94 | 0.2 | 1.5 | 2.5 | 0.005 | 0.001 | 0.04 | 0.002 | Cr: 0.7, Nb: 0.004, Ti: 0.004 |

TABLE 2-1

| | | Recrystallization annealing conditions | | | | | | | |
|---|---|---|---|---|---|---|---|---|---|
| | | Heating furnace conditions | | | | Soaking pit conditions | | | |
| No. | Cold-rolled steel sheet | Maximum sheet temperature [° C.] | Time period that temperature of cold-rolled steel sheet is in temperature range of 500° C. to 950° C. in heating furnace [sec] | Oxygen potential $\log P_{H2O}/P_{H2}$ | Hydrogen concentration [vol %] | Maximum sheet temperature [° C.] | Time period that temperature of cold-rolled steel sheet is in temperature range of 500° C. to 950° C. in soaking pit [sec] | Oxygen potential $\log P_{H2O}/P_{H2}$ | Hydrogen concentration [vol %] |
| A1 | Test material 1 | 675 | 253 | −1.4 | 19 | 675 | 297 | −6.1 | 3 |
| A2 | Test material 3 | 852 | 442 | −2.4 | 26 | 854 | 510 | −5.2 | 27 |
| A3 | Test material 4 | 813 | 356 | −2.2 | 9 | 814 | 707 | −7.3 | 15 |
| A4 | Test material 6 | 720 | 421 | −2.3 | 4 | 723 | 199 | −6.1 | 6 |
| A5 | Test material 7 | 778 | 967 | −1.5 | 15 | 780 | 421 | −7.2 | 15 |
| A6 | Test material 9 | 738 | 279 | −3.0 | 19 | 739 | 251 | −6.0 | 18 |
| A7 | Test material 10 | 725 | 698 | −2.7 | 20 | 725 | 274 | −7.5 | 23 |
| A8 | Test material 13 | 678 | 487 | −0.7 | 22 | 681 | 444 | −4.7 | 27 |
| A9 | Test material 14 | 716 | 218 | −3.4 | 16 | 719 | 403 | −6.7 | 23 |
| A10 | Test material 15 | 616 | 144 | −3.2 | 16 | 618 | 110 | −7.4 | 16 |
| A11 | Test material 16 | 669 | 210 | −3.5 | 21 | 670 | 753 | −6.5 | 24 |
| A12 | Test material 18 | 726 | 756 | −1.5 | 22 | 728 | 560 | −7.4 | 9 |
| A13 | Test material 20 | 815 | 438 | −2.6 | 28 | 816 | 714 | −5.6 | 3 |
| A14 | Test material 21 | 612 | 291 | −1.5 | 5 | 614 | 703 | −5.3 | 8 |
| A15 | Test material 22 | 754 | 462 | −2.9 | 11 | 756 | 604 | −5.6 | 13 |
| A16 | Test material 24 | 638 | 157 | −2.4 | 16 | 641 | 610 | −5.3 | 9 |
| A17 | Test material 26 | 826 | 442 | −3.3 | 4 | 828 | 573 | −7.3 | 26 |
| A18 | Test material 27 | 856 | 725 | −1.4 | 11 | 857 | 600 | −4.2 | 18 |
| A19 | Test material 29 | 783 | 336 | −1.6 | 15 | 795 | 765 | −6.4 | 22 |
| A20 | Test material 30 | 775 | 302 | −2.5 | 24 | 777 | 613 | −6.1 | 4 |
| A21 | Test material 31 | 766 | 285 | −2.6 | 18 | 768 | 257 | −6.7 | 16 |
| A22 | Test material 32 | 800 | 329 | −3.1 | 29 | 801 | 609 | −5.9 | 22 |
| A23 | Test material 34 | 843 | 319 | −1.3 | 16 | 844 | 299 | −5.9 | 3 |
| A24 | Test material 36 | 826 | 856 | −2.6 | 14 | 829 | 187 | −6.3 | 10 |
| A25 | Test material 37 | 647 | 506 | −2.9 | 22 | 649 | 397 | −4.4 | 13 |
| A26 | Test material 38 | 670 | 328 | −0.8 | 15 | 671 | 182 | −6.4 | 27 |
| A27 | Test material 39 | 736 | 716 | −3.2 | 13 | 738 | 645 | −6.9 | 7 |
| A28 | Test material 40 | 634 | 275 | −2.0 | 19 | 635 | 196 | −5.0 | 26 |
| A29 | Test material 41 | 856 | 398 | −2.1 | 12 | 859 | 813 | −6.6 | 17 |
| A30 | Test material 42 | 696 | 240 | −2.7 | 5 | 697 | 465 | −6.8 | 5 |
| A31 | Test material 43 | 899 | 666 | −1.8 | 15 | 901 | 251 | −6.9 | 5 |
| A32 | Test material 44 | 686 | 357 | −2.0 | 4 | 687 | 622 | −4.7 | 10 |
| A33 | Test material 45 | 712 | 277 | −2.1 | 15 | 712 | 315 | −6.9 | 26 |
| A34 | Test material 47 | 854 | 425 | −1.8 | 15 | 857 | 195 | −6.2 | 13 |
| A35 | Test material 49 | 625 | 361 | −2.2 | 26 | 626 | 467 | −6.7 | 12 |
| A36 | Test material 50 | 717 | 228 | −2.6 | 21 | 718 | 537 | −7.0 | 25 |
| A37 | Test material 51 | 858 | 506 | −2.4 | 25 | 861 | 418 | −4.5 | 20 |
| A38 | Test material 52 | 748 | 468 | −3.0 | 13 | 749 | 187 | −4.8 | 18 |

TABLE 2-2

| | | Recrystallization annealing conditions | | | | | | | |
|---|---|---|---|---|---|---|---|---|---|
| | | Heating furnace conditions | | | | Soaking pit conditions | | | |
| No. | Cold-rolled steel sheet | Maximum sheet temperature [° C.] | Time period that temperature of cold-rolled steel sheet is in temperature range of 500° C. to 950° C. in heating furnace [sec] | Oxygen potential $\log P_{H2O}/P_{H2}$ | Hydrogen concentration [vol %] | Maximum sheet temperature [° C.] | Time period that temperature of cold-rolled steel sheet is in temperature range of 500° C. to 950° C. in soaking pit [sec] | Oxygen potential $\log P_{H2O}/P_{H2}$ | Hydrogen concentration [vol %] |
| A39 | Test material 53 | 672 | 201 | −3.1 | 12 | 675 | 430 | −6.7 | 9 |
| A40 | Test material 54 | 812 | 409 | −3.5 | 3 | 813 | 385 | −6.0 | 13 |
| A41 | Test material 55 | 883 | 531 | −1.6 | 21 | 883 | 801 | −5.4 | 23 |
| A42 | Test material 56 | 869 | 420 | −2.8 | 22 | 871 | 836 | −6.3 | 12 |
| A43 | Test material 57 | 825 | 372 | −2.3 | 18 | 826 | 724 | −6.0 | 23 |
| A44 | Test material 58 | 628 | 292 | −3.4 | 6 | 630 | 473 | −5.1 | 9 |
| A45 | Test material 59 | 899 | 657 | −2.7 | 3 | 900 | 536 | −4.8 | 12 |
| A46 | Test material 60 | 631 | 154 | −1.8 | 21 | 631 | 477 | −6.9 | 14 |
| A47 | Test material 61 | 716 | 230 | −2.3 | 11 | 716 | 213 | −5.3 | 18 |
| A48 | Test material 63 | 729 | 305 | −3.1 | 28 | 730 | 496 | −6.9 | 23 |
| A49 | Test material 64 | 818 | 500 | −3.2 | 7 | 821 | 523 | −6.0 | 13 |
| A50 | Test material 65 | 843 | 410 | −3.2 | 12 | 843 | 389 | −4.6 | 7 |
| A51 | Test material 66 | 834 | 378 | −0.9 | 17 | 836 | 673 | −5.3 | 13 |
| A52 | Test material 67 | 702 | 368 | −3.1 | 3 | 703 | 560 | −4.8 | 14 |
| A53 | Test material 68 | 708 | 320 | −3.1 | 11 | 710 | 191 | −4.9 | 27 |
| A54 | Test material 69 | 611 | 198 | −3.1 | 8 | 611 | 733 | −4.9 | 23 |
| A55 | Test material 71 | 824 | 667 | −1.1 | 16 | 826 | 576 | −6.7 | 16 |
| A56 | Test material 72 | 648 | 207 | −1.4 | 19 | 651 | 199 | −5.7 | 4 |
| A57 | Test material 74 | 767 | 519 | −1.6 | 23 | 769 | 600 | −5.5 | 9 |
| A58 | Test material 76 | 842 | 606 | −0.9 | 7 | 844 | 687 | −5.0 | 17 |
| A59 | Test material 77 | 882 | 368 | −2.3 | 9 | 883 | 357 | −6.8 | 22 |
| A60 | Test material 78 | 894 | 824 | −2.7 | 4 | 894 | 581 | −6.0 | 12 |
| A61 | Test material 79 | 656 | 552 | −2.4 | 12 | 657 | 370 | −6.0 | 27 |
| A62 | Test material 80 | 726 | 753 | −2.1 | 19 | 727 | 203 | −4.6 | 15 |
| A63 | Test material 81 | 755 | 664 | −3.3 | 7 | 756 | 411 | −4.7 | 10 |
| A64 | Test material 82 | 820 | 514 | −0.8 | 21 | 820 | 223 | −4.7 | 16 |
| A65 | Test material 83 | 888 | 781 | −0.9 | 22 | 890 | 857 | −4.9 | 25 |
| A66 | Test material 84 | 699 | 315 | −2.7 | 14 | 699 | 459 | −4.8 | 29 |
| A67 | Test material 85 | 614 | 338 | −1.5 | 25 | 617 | 755 | −6.1 | 16 |
| A68 | Test material 86 | 634 | 171 | −1.7 | 8 | 637 | 554 | −4.9 | 11 |
| A69 | Test material 87 | 821 | 386 | −1.5 | 7 | 823 | 783 | −4.5 | 11 |
| A70 | Test material 88 | 773 | 323 | −0.7 | 24 | 774 | 785 | −5.7 | 7 |
| A71 | Test material 89 | 841 | 444 | −1.8 | 19 | 843 | 343 | −4.2 | 4 |
| A72 | Test material 90 | 803 | 374 | −3.2 | 22 | 804 | 275 | −4.6 | 24 |
| A73 | Test material 91 | 664 | 240 | −2.3 | 13 | 665 | 239 | −6.4 | 29 |
| A74 | Test material 92 | 825 | 519 | −1.0 | 27 | 827 | 294 | −6.8 | 5 |
| A75 | Test material 93 | 798 | 327 | −3.2 | 24 | 799 | 399 | −5.6 | 20 |
| A76 | Test material 94 | 632 | 158 | −2.9 | 12 | 634 | 176 | −6.5 | 9 |

TABLE 2-3

| | | | Alloyed hot-dip galvanized layer | | | A layer immediately under surface of substrate steel sheet | | | Evaluation | | |
|---|---|---|---|---|---|---|---|---|---|---|---|
| | | | | | Un-oxidized | | Total of contents of | | | | |
| No. | Alloying treatment temperature [° C.] | Tensile strength [MPa] | Fe content [wt %] | Thickness [μm] | Thickness [μm] | Ferrite content [vol %] | Fe content [wt %] | oxides of Fe, Si, Mn, P, S, and Al [wt %] | C content | wettability of plating | adhesion of plated layer | Remark |
| A1 | 480 | 860 | 11 | 5 | 11 | 66 | 95 | 3.4 | 0.012 | Excellent | Excellent | Example |
| A2 | 513 | 738 | 10 | 5 | 10 | 76 | 95 | 3.9 | 0.016 | Excellent | Excellent | Example |
| A3 | 562 | 668 | 11 | 4 | 11 | 55 | 92 | 6.3 | 0.017 | Good | Good | Example |
| A4 | 568 | 807 | 12 | 5 | 12 | 54 | 93 | 5.5 | 0.008 | Excellent | Excellent | Example |
| A5 | 537 | 830 | 11 | 6 | 19 | 82 | 91 | 7.5 | 0.009 | Good | Good | Example |
| A6 | 454 | 739 | 7 | 8 | 7 | 56 | 93 | 6.8 | 0.017 | Excellent | Excellent | Example |
| A7 | 554 | 785 | 13 | 6 | 18 | 53 | 93 | 5.9 | 0.016 | Good | Good | Example |
| A8 | 500 | 639 | 6 | 4 | 6 | 54 | 94 | 4.5 | 0.014 | Excellent | Good | Example |
| A9 | 574 | 1067 | 11 | 5 | 11 | 58 | 93 | 6.7 | 0.006 | Excellent | Excellent | Example |
| A10 | 476 | 1000 | 15 | 4 | 17 | 56 | 95 | 4.2 | 0.010 | Good | Good | Example |
| A11 | 459 | 727 | 9 | 6 | 9 | 55 | 96 | 1.9 | 0.017 | Excellent | Excellent | Example |
| A12 | 569 | 608 | 13 | 10 | 13 | 58 | 92 | 5.8 | 0.010 | Good | Good | Example |
| A13 | 488 | 865 | 13 | 10 | 13 | 63 | 93 | 6.2 | 0.022 | Excellent | Excellent | Example |
| A14 | 524 | 673 | 14 | 6 | 11 | 73 | 95 | 4.5 | 0.025 | Excellent | Excellent | Example |

TABLE 2-3-continued

A layer immediately under surface of substrate steel sheet

| No. | Alloying treatment temperature [° C.] | Tensile strength [MPa] | Alloyed hot-dip galvanized layer Fe content [wt %] | Alloyed hot-dip galvanized layer Thickness [μm] | Thickness [μm] | Ferrite content [vol %] | Un-oxidized Fe content [wt %] | Total of contents of oxides of Fe, Si, Mn, P, S, and Al [wt %] | C content | Evaluation wettability of plating | Evaluation adhesion of plated layer | Remark |
|---|---|---|---|---|---|---|---|---|---|---|---|---|
| A15 | 510 | 752 | 9 | 3 | 9 | 68 | 91 | 7.4 | 0.017 | Excellent | Good | Example |
| A16 | 475 | 961 | 15 | 1 | 18 | 59 | 96 | 2.2 | 0.020 | Excellent | Good | Example |
| A17 | 477 | 912 | 14 | 8 | 17 | 51 | 96 | 2.4 | 0.011 | Good | Good | Example |
| A18 | 536 | 809 | 14 | 4 | 13 | 88 | 92 | 6.4 | 0.020 | Excellent | Excellent | Example |
| A19 | 502 | 998 | 12 | 6 | 12 | 79 | 91 | 7.4 | 0.014 | Excellent | Good | Example |
| A20 | 509 | 903 | 8 | 6 | 6 | 61 | 95 | 3.2 | 0.008 | Excellent | Excellent | Example |
| A21 | 520 | 1047 | 11 | 10 | 11 | 57 | 95 | 4.3 | 0.025 | Excellent | Good | Example |
| A22 | 500 | 638 | 13 | 4 | 13 | 57 | 94 | 3.6 | 0.016 | Excellent | Excellent | Example |
| A23 | 578 | 716 | 14 | 8 | 14 | 95 | 95 | 3.9 | 0.015 | Excellent | Excellent | Example |
| A24 | 581 | 906 | 6 | 5 | 5 | 78 | 95 | 4.7 | 0.024 | Excellent | Good | Example |
| A25 | 535 | 1001 | 14 | 9 | 14 | 64 | 95 | 3.1 | 0.016 | Excellent | Excellent | Example |
| A26 | 543 | 882 | 11 | 5 | 11 | 93 | 97 | 1.3 | 0.011 | Excellent | Good | Example |
| A27 | 550 | 727 | 8 | 7 | 5 | 60 | 95 | 4.8 | 0.026 | Good | Excellent | Example |
| A28 | 477 | 830 | 12 | 7 | 12 | 65 | 96 | 2.4 | 0.017 | Excellent | Good | Example |
| A29 | 543 | 847 | 9 | 5 | 9 | 69 | 92 | 6.8 | 0.015 | Excellent | Excellent | Example |
| A30 | 526 | 695 | 10 | 5 | 10 | 76 | 92 | 7.3 | 0.015 | Excellent | Excellent | Example |
| A31 | 570 | 1089 | 7 | 4 | 4 | 56 | 93 | 5.1 | 0.019 | Excellent | Good | Example |
| A32 | 454 | 913 | 9 | 7 | 9 | 81 | 93 | 5.7 | 0.016 | Excellent | Excellent | Example |
| A33 | 544 | 909 | 14 | 9 | 14 | 78 | 94 | 4.9 | 0.025 | Excellent | Good | Example |
| A34 | 523 | 603 | 13 | 7 | 13 | 56 | 95 | 4.0 | 0.028 | Excellent | Good | Example |
| A35 | 460 | 717 | 7 | 6 | 3 | 60 | 94 | 5.7 | 0.025 | Excellent | Excellent | Example |
| A36 | 500 | 1027 | 13 | 7 | 13 | 55 | 97 | 2.3 | 0.021 | Good | Good | Example |
| A37 | 456 | 642 | 10 | 10 | 10 | 69 | 93 | 6.9 | 0.015 | Excellent | Excellent | Example |
| A38 | 460 | 978 | 13 | 6 | 13 | 82 | 95 | 4.5 | 0.021 | Excellent | Good | Example |

TABLE 2-4

A layer immediately under surface of substrate steel sheet

| No. | Alloying treatment temperature [° C.] | Tensile strength [MPa] | Alloyed hot-dip galvanized layer Fe content [wt %] | Alloyed hot-dip galvanized layer Thickness [μm] | Thickness [μm] | Ferrite content [vol %] | Un-oxidized Fe content [wt %] | Total of contents of oxides of Fe, Si, Mn, P, S, and Al [wt %] | C content | Evaluation wettability of plating | Evaluation adhesion of plated layer | Remark |
|---|---|---|---|---|---|---|---|---|---|---|---|---|
| A39 | 507 | 787 | 14 | 8 | 14 | 63 | 93 | 6.8 | 0.016 | Excellent | Excellent | Example |
| A40 | 566 | 657 | 6 | 8 | 4 | 54 | 97 | 1.4 | 0.019 | Excellent | Good | Example |
| A41 | 550 | 906 | 14 | 8 | 13 | 83 | 93 | 5.4 | 0.033 | Excellent | Excellent | Example |
| A42 | 556 | 662 | 12 | 8 | 12 | 62 | 93 | 7.3 | 0.024 | Excellent | Excellent | Example |
| A43 | 537 | 796 | 11 | 5 | 11 | 69 | 95 | 3.9 | 0.023 | Excellent | Good | Example |
| A44 | 453 | 954 | 15 | 8 | 14 | 58 | 92 | 6.4 | 0.023 | Excellent | Excellent | Example |
| A45 | 501 | 714 | 7 | 22 | 7 | 62 | 93 | 4.9 | 0.023 | Excellent | Good | Example |
| A46 | 501 | 759 | 11 | 17 | 11 | 74 | 94 | 4.7 | 0.030 | Excellent | Excellent | Example |
| A47 | 480 | 689 | 14 | 24 | 17 | 78 | 96 | 4.2 | 0.035 | Excellent | Good | Example |
| A48 | 584 | 1010 | 10 | 28 | 10 | 65 | 97 | 1.9 | 0.033 | Excellent | Excellent | Example |
| A49 | 566 | 812 | 14 | 11 | 18 | 65 | 96 | 4.2 | 0.039 | Excellent | Good | Example |
| A50 | 471 | 1077 | 10 | 18 | 10 | 61 | 94 | 5.3 | 0.030 | Excellent | Excellent | Example |
| A51 | 548 | 1026 | 13 | 17 | 13 | 99 | 91 | 7.4 | 0.033 | Excellent | Good | Example |
| A52 | 523 | 867 | 12 | 21 | 12 | 65 | 95 | 3.3 | 0.035 | Good | Excellent | Example |
| A53 | 524 | 595 | 8 | 10 | 5 | 60 | 93 | 5.2 | 0.039 | Excellent | Good | Example |
| A54 | 498 | 907 | 9 | 12 | 9 | 63 | 94 | 5.4 | 0.032 | Excellent | Excellent | Example |
| A55 | 489 | 749 | 7 | 27 | 7 | 56 | 93 | 5.9 | 0.024 | Excellent | Good | Example |
| A56 | 452 | 843 | 11 | 15 | 11 | 90 | 94 | 3.9 | 0.022 | Excellent | Excellent | Example |
| A57 | 515 | 732 | 9 | 13 | 9 | 55 | 93 | 5.7 | 0.027 | Excellent | Excellent | Example |
| A58 | 485 | 914 | 13 | 9 | 13 | 70 | 93 | 7.3 | 0.017 | Excellent | Good | Example |
| A59 | 526 | 625 | 13 | 15 | 13 | 72 | 94 | 4.5 | 0.013 | Excellent | Excellent | Example |
| A60 | 590 | 1055 | 12 | 10 | 12 | 60 | 92 | 7.5 | 0.022 | Excellent | Good | Example |
| A61 | 528 | 944 | 11 | 12 | 11 | 65 | 95 | 5.1 | 0.020 | Excellent | Excellent | Example |
| A62 | 585 | 981 | 8 | 26 | 8 | 57 | 95 | 3.8 | 0.019 | Good | Good | Example |
| A63 | 571 | 988 | 10 | 7 | 10 | 56 | 94 | 5.1 | 0.020 | Excellent | Excellent | Example |
| A64 | 503 | 1083 | 9 | 17 | 9 | 67 | 95 | 3.8 | 0.015 | Excellent | Good | Example |
| A65 | 457 | 990 | 10 | 11 | 10 | 68 | 94 | 4.0 | 0.023 | Excellent | Excellent | Example |
| A66 | 555 | 810 | 14 | 11 | 14 | 74 | 96 | 4.2 | 0.023 | Excellent | Excellent | Example |
| A67 | 578 | 826 | 14 | 13 | 14 | 54 | 96 | 3.6 | 0.012 | Excellent | Good | Example |
| A68 | 471 | 849 | 13 | 14 | 13 | 78 | 95 | 3.9 | 0.010 | Excellent | Excellent | Example |
| A69 | 565 | 948 | 12 | 14 | 12 | 69 | 93 | 5.6 | 0.010 | Excellent | Good | Example |

TABLE 2-4-continued

| | A layer immediately under surface of substrate steel sheet | | | | | | | Evaluation | | |
|---|---|---|---|---|---|---|---|---|---|---|
| | Alloying | | Alloyed hot-dip galvanized layer | | | Un-oxidized | Total of contents of | | | |
| No. | treatment temperature [° C.] | Tensile strength [MPa] | Fe content [wt %] | Thickness [μm] | Thickness [μm] | Ferrite content [vol %] | Fe content [wt %] | oxides of Fe, Si, Mn, P, S, and Al [wt %] | C content | wettability of plating | adhesion of plated layer | Remark |
| A70 | 526 | 598 | 13 | 7 | 13 | 95 | 96 | 2.7 | 0.016 | Excellent | Excellent | Example |
| A71 | 561 | 1007 | 14 | 10 | 14 | 71 | 92 | 6.6 | 0.028 | Excellent | Good | Example |
| A72 | 530 | 771 | 7 | 20 | 3 | 63 | 92 | 6.8 | 0.015 | Good | Excellent | Example |
| A73 | 538 | 705 | 8 | 20 | 5 | 77 | 93 | 6.5 | 0.011 | Excellent | Excellent | Example |
| A74 | 569 | 978 | 8 | 26 | 8 | 88 | 95 | 4.1 | 0.025 | Excellent | Good | Example |
| A75 | 570 | 967 | 14 | 16 | 14 | 82 | 92 | 6.7 | 0.018 | Excellent | Excellent | Example |
| A76 | 473 | 827 | 14 | 9 | 15 | 57 | 95 | 3.0 | 0.027 | Excellent | Good | Example |

TABLE 3-1

| | | Recrystallization annealing conditions | | | | | | | |
|---|---|---|---|---|---|---|---|---|---|
| | | Heating furnace conditions | | | | Soaking pit conditions | | | |
| No. | Cold-rolled steel sheet | Maximum sheet temperature [° C.] | Time period that temperature of cold-rolled steel sheet is in temperature range of 500° C. to 950° C. in heating furnace [sec] | Oxygen potential $\log P_{H2O}/P_{H2}$ | Hydrogen concentration [vol %] | Maximum sheet temperature [° C.] | Time period that temperature of cold-rolled steel sheet is in temperature range of 500° C. to 950° C. in soaking pit [sec] | Oxygen potential $\log P_{H2O}/P_{H2}$ | Hydrogen concentration [vol %] |
| B1 | Test material 1 | <u>479</u> | <u>0</u> | <u>−1.5</u> | 19 | 621 | 115 | −6.5 | 19 |
| B2 | Test material 3 | 621 | 115 | <u>−1.6</u> | 15 | <u>433</u> | <u>0</u> | −7.2 | 15 |
| B3 | Test material 5 | <u>483</u> | <u>0</u> | −4.2 | 24 | <u>485</u> | <u>0</u> | <u>−3.2</u> | 24 |
| B4 | Test material 7 | <u>963</u> | 313 | −2.2 | 9 | 878 | 251 | −7.4 | 9 |
| B5 | Test material 9 | 921 | 856 | <u>−1.1</u> | 12 | <u>978</u> | 351 | −6.8 | 12 |
| B6 | Test material 11 | <u>991</u> | 1050 | −2.3 | 6 | <u>989</u> | 542 | <u>−3.8</u> | 6 |
| B7 | Test material 13 | 778 | 278 | <u>0.3</u> | 15 | 780 | 421 | −6.0 | 15 |
| B8 | Test material 17 | 738 | 238 | <u>−4.3</u> | 19 | 739 | 251 | −7.0 | 19 |
| B9 | Test material 19 | 725 | 225 | <u>−1.3</u> | 20 | 725 | 274 | <u>−8.3</u> | 20 |
| B10 | Test material 21 | 658 | 158 | <u>0.2</u> | 23 | 659 | 708 | <u>−8.5</u> | 23 |
| B11 | Test material 27 | 716 | 216 | <u>−4.7</u> | 16 | 719 | 403 | <u>−3.2</u> | 16 |
| B12 | Test material 29 | 616 | 116 | −3.2 | <u>1</u> | 618 | 70 | −7.4 | 10 |
| B13 | Test material 31 | 669 | 169 | −3.5 | <u>35</u> | 670 | 753 | −6.5 | <u>1</u> |
| B14 | Test material 33 | 612 | 112 | <u>−1.0</u> | <u>32</u> | 615 | 242 | −6.0 | <u>35</u> |
| B15 | Test material 35 | 726 | 226 | <u>−1.5</u> | 12 | 728 | 560 | −7.4 | <u>1</u> |
| B16 | Test material 37 | 778 | 278 | <u>−1.7</u> | 7 | 780 | 835 | −4.9 | <u>38</u> |
| B17 | Test material 39 | 815 | 315 | −2.6 | 24 | 816 | 714 | −5.6 | 24 |
| B18 | Test material 41 | 612 | 112 | <u>−1.5</u> | 7 | 614 | 703 | −5.3 | 7 |
| B19 | Test material 43 | 754 | 254 | −2.9 | 11 | 756 | 604 | −5.6 | 11 |
| B20 | Test material 45 | 879 | 379 | <u>−1.6</u> | 17 | 881 | 761 | −6.4 | 17 |
| B21 | Test material 47 | 638 | 138 | −2.4 | 16 | 641 | 610 | −5.3 | 16 |
| B22 | Test material 49 | 855 | 355 | <u>−0.5</u> | 10 | 856 | 711 | −4.2 | 10 |
| B23 | Test material 51 | 826 | 326 | −3.3 | 6 | 828 | 573 | −7.3 | 6 |
| B24 | Test material 53 | 856 | 356 | <u>−1.4</u> | 11 | 857 | 600 | −4.2 | 11 |
| B25 | Test material 55 | 782 | 282 | <u>−0.9</u> | 24 | 783 | 314 | −4.3 | 24 |
| B26 | Test material 57 | 793 | 293 | <u>−1.6</u> | 15 | 795 | 765 | −6.4 | 15 |
| B27 | Test material 59 | 775 | 275 | −2.5 | 24 | 777 | 613 | −6.1 | 24 |
| B28 | Test material 61 | 766 | <u>35</u> | −1.5 | 18 | 768 | 257 | −6.7 | 18 |
| B29 | Test material 63 | 800 | <u>92</u> | <u>0.2</u> | 8 | 795 | 195 | −5.9 | 25 |
| B30 | Test material 65 | 793 | <u>1061</u> | <u>0.5</u> | 16 | 844 | 299 | −6.5 | 8 |
| B31 | Test material 67 | 843 | 1030 | <u>−1.3</u> | 22 | 701 | 315 | −5.9 | 16 |
| B32 | Test material 69 | 700 | <u>1120</u> | −2.6 | 14 | 829 | <u>1011</u> | −4.6 | 22 |
| B33 | Test material 71 | 826 | <u>79</u> | −3.1 | 25 | 801 | <u>1097</u> | −6.3 | 14 |
| B34 | Test material 73 | 647 | <u>35</u> | −4.5 | 15 | 671 | <u>91</u> | −4.4 | 22 |
| B35 | Test material 75 | 670 | <u>82</u> | −4.7 | 19 | 635 | <u>1013</u> | −6.4 | 15 |
| B36 | Test material 77 | 736 | 1013 | −2.1 | 12 | 859 | <u>1058</u> | −6.9 | 13 |
| B37 | Test material 79 | 634 | 196 | −2.7 | 8 | 697 | <u>1101</u> | −5.0 | 19 |
| B38 | Test material 81 | 856 | 147 | −2.9 | 22 | 649 | <u>62</u> | −6.6 | 12 |
| B39 | Test material 83 | 696 | 236 | −4.8 | 13 | 738 | <u>35</u> | −6.8 | 8 |

Note:
Underlined value is out of range of the present invention.

TABLE 3-2

| | | | Alloyed hot-dip galvanized layer | | | Un-oxidized | Total of contents of | | Evaluation | | |
|---|---|---|---|---|---|---|---|---|---|---|---|
| | Alloying treatment temperature [° C.] | Tensile strength [MPa] | Fe content [wt %] | Thickness [μm] | Thickness [μm] | Ferrite content [vol %] | Fe content [wt %] | oxides of Fe, Si, Mn, P, S, and Al [wt %] | C content | wettability of plating | adhesion of plated layer | Remark |
| No. | | | | | | | | | | | | |
| B1 | 480 | 567 | 11 | 5 | 0 | 35 | 86 | 12.0 | 0.052 | Poor | Poor | Comparative Example |
| B2 | 582 | 561 | 8 | 4 | 0 | 42 | 85 | 13.0 | 0.055 | Poor | Poor | Comparative Example |
| B3 | 513 | 523 | 10 | 5 | 0 | 35 | 82 | 15.0 | 0.057 | Poor | Poor | Comparative Example |
| B4 | 562 | 668 | 11 | 4 | 0 | 55 | 73 | 25.0 | 0.017 | Poor | Poor | Comparative Example |
| B5 | 554 | 743 | 11 | 4 | 0 | 51 | 77 | 21.0 | 0.013 | Poor | Poor | Comparative Example |
| B6 | 568 | 807 | 12 | 5 | 0 | 54 | 84 | 15.0 | 0.008 | Poor | Poor | Comparative Example |
| B7 | 537 | 533 | 11 | 6 | 0 | 89 | 86 | 12.0 | 0.009 | Poor | Poor | Comparative Example |
| B8 | 454 | 739 | 7 | 8 | 0 | 37 | 75 | 23.0 | 0.075 | Poor | Poor | Comparative Example |
| B9 | 554 | 785 | 13 | 6 | 0 | 64 | 77 | 21.0 | 0.080 | Poor | Poor | Comparative Example |
| B10 | 590 | 664 | 10 | 7 | 0 | 76 | 75 | 23.0 | 0.019 | Poor | Poor | Comparative Example |
| B11 | 574 | 1067 | 11 | 5 | 0 | 25 | 78 | 21.0 | 0.065 | Poor | Poor | Comparative Example |
| B12 | 476 | 1000 | 15 | 4 | 15 | 56 | 94 | 4.2 | 0.010 | Good | Poor | Comparative Example |
| B13 | 459 | 727 | 9 | 6 | 9 | 55 | 97 | 1.9 | 0.017 | Good | Poor | Comparative Example |
| B14 | 516 | 868 | 10 | 5 | 10 | 84 | 92 | 5.1 | 0.008 | Good | Poor | Comparative Example |
| B15 | 569 | 608 | 13 | 10 | 13 | 58 | 93 | 5.8 | 0.010 | Good | Poor | Comparative Example |
| B16 | 551 | 1076 | 11 | 5 | 11 | 64 | 94 | 3.5 | 0.020 | Good | Poor | Comparative Example |
| B17 | 435 | 865 | 2 | 10 | 13 | 63 | 91 | 6.2 | 0.022 | Good | Poor | Comparative Example |
| B18 | 430 | 673 | 3 | 6 | 15 | 73 | 93 | 4.5 | 0.025 | Good | Poor | Comparative Example |
| B19 | 620 | 752 | 17 | 3 | 9 | 68 | 90 | 7.4 | 0.017 | Good | Poor | Comparative Example |
| B20 | 630 | 708 | 19 | 3 | 12 | 82 | 96 | 2.6 | 0.009 | Good | Poor | Comparative Example |
| B21 | 660 | 961 | 18 | 7 | 15 | 59 | 95 | 2.2 | 0.020 | Good | Poor | Comparative Example |
| B22 | 518 | 1021 | 18 | 2 | 12 | 78 | 94 | 4.1 | 0.020 | Poor | Poor | Comparative Example |
| B23 | 477 | 912 | 17 | 1.5 | 14 | 58 | 96 | 2.4 | 0.011 | Poor | Poor | Comparative Example |
| B24 | 536 | 809 | 20 | 1 | 14 | 88 | 92 | 5.8 | 0.020 | Poor | Poor | Comparative Example |
| B25 | 547 | 641 | 10 | 40 | 9 | 89 | 92 | 6.2 | 0.020 | Good | Poor | Comparative Example |
| B26 | 502 | 998 | 7 | 50 | 12 | 79 | 90 | 7.4 | 0.014 | Good | Poor | Comparative Example |
| B27 | 509 | 903 | 8 | 35 | 8 | 53 | 95 | 3.2 | 0.008 | Good | Poor | Comparative Example |
| B28 | 520 | 1047 | 11 | 10 | 0.5 | 57 | 94 | 4.3 | 0.025 | Poor | Poor | Comparative Example |
| B29 | 500 | 638 | 13 | 4 | 0.4 | 57 | 95 | 3.6 | 0.016 | Poor | Poor | Comparative Example |
| B30 | 511 | 757 | 13 | 7 | 40 | 61 | 95 | 2.7 | 0.007 | Poor | Poor | Comparative Example |
| B31 | 578 | 716 | 14 | 8 | 25 | 95 | 95 | 3.9 | 0.015 | Poor | Poor | Comparative Example |
| B32 | 496 | 699 | 11 | 4 | 30 | 63 | 91 | 6.3 | 0.013 | Poor | Poor | Comparative Example |
| B33 | 581 | 906 | 6 | 5 | 27 | 52 | 93 | 4.7 | 0.024 | Poor | Poo | Comparative Example |
| B34 | 535 | 1001 | 14 | 9 | 1 | 64 | 96 | 3.1 | 0.016 | Poor | Poor | Comparative Example |
| B35 | 543 | 882 | 11 | 5 | 0.4 | 93 | 97 | 1.3 | 0.011 | Poor | Poor | Comparative Example |

TABLE 3-2-continued

| | | | A layer immediately under surface of substrate steel sheet | | | | | | | | |
|---|---|---|---|---|---|---|---|---|---|---|---|
| | Alloying | | Alloyed hot-dip galvanized layer | | | | Un-oxidized | Total of contents of | | Evaluation | |
| No. | treatment temperature [° C.] | Tensile strength [MPa] | Fe content [wt %] | Thick-ness [μm] | Thick-ness [μm] | Ferrite content [vol %] | Fe content [wt %] | oxides of Fe, Si, Mn, P, S, and Al [wt %] | C content | wettability of plating | adhesion of plated layer | Remark |
| B36 | 550 | 727 | 8 | 7 | <u>33</u> | 60 | 93 | 4.8 | 0.026 | Poor | Poor | Comparative Example |
| B37 | 477 | 830 | 12 | 7 | <u>1</u> | 65 | 96 | 2.4 | 0.017 | Poor | Poor | Comparative Example |
| B38 | 543 | 847 | 9 | 5 | <u>0.5</u> | 69 | 90 | 6.8 | 0.015 | Poor | Poor | Comparative Example |
| B39 | 526 | 695 | 10 | 5 | <u>0.5</u> | 76 | 90 | 7.3 | 0.015 | Poor | Poor | Comparative Example |

Note:
Underlined value is out of range of the present invention.

INDUSTRIAL APPLICABILITY

The alloyed hot-dip galvanized steel sheet manufactured using the method according to the present invention has a high strength with a tensile strength of 590 MPa or more, and has excellent wettability of plating and adhesion of plated layer. Accordingly, it is expected that the alloyed hot-dip galvanized steel sheet is applied as a material used in an automotive field, a household appliance field, and a building material field.

The invention claimed is:

1. An alloyed hot-dip galvanized steel sheet comprising a base steel sheet,
wherein the base steel sheet contains, in mass %,
C: more than or equal to 0.05% and less than or equal to 0.50%,
Si: more than or equal to 0.2% and less than or equal to 3.0%,
Mn: more than or equal to 0.5% and less than or equal to 5.0%,
Al: more than or equal to 0.001 and less than or equal to 1.0%,
P: less than or equal to 0.1%,
S: less than or equal to 0.01%,
N: less than or equal to 0.01%, and
the balance including Fe and inevitable impurities,
wherein the alloyed hot-dip galvanized steel sheet is provided with an alloyed hot-dip galvanized layer on a surface of the base steel sheet, the alloyed hot-dip galvanized layer containing, in mass %, Fe: more than or equal to 5% and less than or equal to 15%, and the balance including Zn and inevitable impurities, and having a thickness of more than or equal to 3μm and less than or equal to 30 μm, and
wherein the alloyed hot-dip galvanized steel sheet comprises an A layer immediately under the surface of the base steel sheet, the A layer being formed in the base steel sheet and having a thickness of more than or equal to 2 μm and less than or equal to 20 μm from the surface of the base steel sheet,
the A layer containing more than or equal to 50 vol % of a ferrite structure based on a volume of the A layer and the balance including inevitable structures, and containing, based on a mass of the A layer, more than or equal to 90 mass % of unoxidized Fe, less than or equal to 10 mass % of a total of contents of oxides of Fe, Si, Mn, P, S, and Al, and less than 0.05 mass % of C.

2. The alloyed hot-dip galvanized steel sheet according to claim 1,
wherein the base steel sheet further contains one or more of, in mass %,
Cr: more than or equal to 0.05% and less than or equal to 1.0%,
Ni: more than or equal to 0.05% and less than or equal to 1.0%,
Cu: more than or equal to 0.05% and less than or equal to 1.0%,
Nb: more than or equal to 0.005% and less than or equal to 0.3%,
Ti: more than or equal to 0.005% and less than or equal to 0.3%,
V: more than or equal to 0.005% and less than or equal to 0.5%,
B: more than or equal to 0.0001% and less than or equal to 0.01%,
Ca: more than or equal to 0.0005% and less than or equal to 0.04%,
Mg: more than or equal to 0.0005% and less than or equal to 0.04%,
La: more than or equal to 0.0005% and less than or equal to 0.04%,
Ce: more than or equal to 0.0005% and less than or equal to 0.04%, and
Y: more than or equal to 0.0005% and less than or equal to 0.04%.

3. The alloyed hot-dip galvanized steel sheet according to claim 2,
wherein the alloyed hot-dip galvanized layer further contains, in mass %, Al: more than or equal to 0.02% and less than or equal to 1.0%.

4. The alloyed hot-dip galvanized steel sheet according to claim 1,
wherein the alloyed hot-dip galvanized layer further contains, in mass %, Al: more than or equal to 0.02% and less than or equal to 1.0%.

* * * * *